United States Patent
Jiao et al.

(10) Patent No.: US 11,632,219 B2
(45) Date of Patent: Apr. 18, 2023

(54) RESOURCE DETERMINING METHOD, INDICATION METHOD, AND APPARATUS

(71) Applicant: HUAWEI TECHNOLOGIES CO., LTD., Guangdong (CN)

(72) Inventors: Shurong Jiao, Shanghai (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 17/038,960

(22) Filed: Sep. 30, 2020

(65) Prior Publication Data

US 2021/0014029 A1    Jan. 14, 2021

Related U.S. Application Data

(63) Continuation of application No. PCT/CN2018/108507, filed on Sep. 28, 2018.

(30) Foreign Application Priority Data

Apr. 4, 2018    (WO) ................ PCT/CN2018/082054

(51) Int. Cl.
*H04L 5/00* (2006.01)
*H04W 72/04* (2023.01)
*H04W 72/044* (2023.01)

(52) U.S. Cl.
CPC .......... *H04L 5/0055* (2013.01); *H04L 5/0007* (2013.01); *H04W 72/042* (2013.01); *H04W 72/044* (2013.01)

(58) Field of Classification Search
CPC ............... H04L 5/0055; H04L 5/0007; H04W 72/042; H04W 72/044
See application file for complete search history.

(56) References Cited

U.S. PATENT DOCUMENTS

| | | | |
|---|---|---|---|
| 8,982,974 | B2 | 3/2015 | Bogdan |
| 2013/0242881 | A1 | 9/2013 | Wang et al. |
| 2014/0036810 | A1* | 2/2014 | Harrison ............... H04L 5/0094 370/329 |

(Continued)

FOREIGN PATENT DOCUMENTS

| | | |
|---|---|---|
| CN | 101686103 A | 3/2010 |
| CN | 101827448 A | 9/2010 |

(Continued)

OTHER PUBLICATIONS

Office Action issued in Chinese Application No. 201880090895.9 dated Jul. 22, 2021, 20 pages.

(Continued)

*Primary Examiner* — Michael J Moore, Jr.
(74) *Attorney, Agent, or Firm* — Fish & Richardson P.C.

(57) ABSTRACT

Example resource determining methods, indication methods, and apparatus are described. On example method includes receiving a downlink data channel by a terminal from a network device. The terminal determines a first uplink control channel resource from a plurality of uplink control channel resources based on an index of the last symbol for the downlink data channel and a time for processing the downlink data channel by the terminal. The terminal sends acknowledgment information to the network device on the first uplink control channel resource, where the acknowledgment information is used to determine a reception status of the downlink data channel.

15 Claims, 23 Drawing Sheets

(56) References Cited

U.S. PATENT DOCUMENTS

| | | | | |
|---|---|---|---|---|
| 2014/0098780 | A1* | 4/2014 | Kim | H04W 72/0413 370/329 |
| 2015/0016311 | A1* | 1/2015 | Han | H04W 72/0413 370/280 |
| 2017/0019237 | A1* | 1/2017 | Yang | H04W 72/042 |
| 2018/0019843 | A1 | 1/2018 | Papasakellariou | |
| 2018/0020434 | A1* | 1/2018 | Shao | H04L 1/1861 |
| 2018/0206224 | A1* | 7/2018 | Hwang | H04L 5/0012 |
| 2019/0297618 | A1* | 9/2019 | Yang | H04W 72/0446 |
| 2019/0372721 | A1* | 12/2019 | Lee | H04L 1/1861 |
| 2019/0393992 | A1* | 12/2019 | Xiong | H04L 1/1812 |
| 2020/0037298 | A1* | 1/2020 | Shi | H04W 72/0406 |
| 2020/0403835 | A1* | 12/2020 | Matsumura | H04W 72/042 |
| 2021/0014029 | A1* | 1/2021 | Jiao | H04W 72/044 |
| 2021/0344462 | A1* | 11/2021 | Jiao | H04L 5/0094 |

FOREIGN PATENT DOCUMENTS

| | | | | |
|---|---|---|---|---|
| CN | 102468940 | A | | 5/2012 |
| CN | 103378932 | A | | 10/2013 |
| CN | 103813345 | A | | 5/2014 |
| CN | 104272635 | A | | 1/2015 |
| CN | 106376050 | A | | 2/2017 |
| CN | 107027181 | A | | 8/2017 |
| CN | 107079440 | A | | 8/2017 |
| WO | 2012034584 | A1 | | 3/2012 |
| WO | WO-2017167394 | A1 * | 10/2017 | H04L 1/1819 |

OTHER PUBLICATIONS

Extended European Search Report issued in European Application No. 18913965.2 dated Feb. 21, 2021, 11 pages.

Huawei et al., "Summary of 7.2.2 Study of necessity of a new DCI format," 3GPP TSG RAN WG1 Meeting #92, R1-1803413, Athens, Greece, Feb. 26-Mar. 2, 2018, 21 pages.

Huawei, "Compact DCI design for URLLC", 3GPP TSG RAN WG1 Meeting #92, R1-1801355, Athens, Greece, Feb. 26-Mar. 2, 2018, 5 pages.

PCT International Search Report and Written Opinion in International Application No. PCT/CN2018/082,054, dated Jan. 2, 2019, 17 pages (With English Translation).

PCT International Search Report and Written Opinion in International Application No. PCT/CN2018/108,507, dated Jan. 3, 2019, 14 pages (With English Translation).

Motorola Mobility, Lenovo, "Resource allocation for short PUCCH," 3GPP TSG RAN WG1 Meeting #88bis, R1-1705554, Spokane, USA, Apr. 3-7, 2017, 4 pages.

Huawei et al., "PDCCH Reliability for URLLC," 3GPP TSG RAN WG1 Ad Hoc Meeting, R1-1800053, Vancouver, Canada, Jan. 22-26, 2018, 6 pages.

Huawei et al., "Summary of 7.2.2 Study of Necessity of a New DCI Format," 3GPP TSG RAN WG1 Meeting #92, R1-1803357, Athens, Greece, Feb. 26-Mar. 2, 2018, 21 pages.

Office Action in European Appln. No. 18913965.2, dated Dec. 21, 2022, 102 pages.

* cited by examiner

RESOURCE DETERMINING METHOD, INDICATION METHOD, AND APPARATUS

CROSS-REFERENCE TO RELATED APPLICATIONS

This application is a continuation of International Application No. PCT/CN2018/108507, filed on Sep. 28, 2018, which claims priority to International Application No. PCT/CN2018/082054, filed on Apr. 4, 2018. The disclosures of the aforementioned applications are hereby incorporated by reference in their entireties.

TECHNICAL FIELD

This application relates to the field of communications technologies, and in particular, to a resource determining method, an indication method, and an apparatus.

BACKGROUND

The fifth generation (5G) mobile communications system emerges, to cope with explosion of mobile data traffic in the future, massive mobile communications device connections, and various emerging new services and application scenarios. The International Telecommunication Union (ITU) defines an ultra-reliable and low-latency communications (URLLC) service scenario for 5G and a future mobile communications system. The URLLC service imposes an extremely high requirement on a latency, and a one-way transmission latency from a transmit end to a receive end is required to be within 0.5 millisecond (ms); in addition, transmission reliability is required to reach 99.999% within 1 ms.

Currently, a terminal in new radio (NR) may determine, in the following manner, a physical uplink control channel (PUCCH) resource used to send an acknowledgment (ACK)/a negative acknowledgment (NACK). The ACK/NACK is used to determine downlink data sent on a physical downlink shared channel (PDSCH). If the terminal correctly receives a downlink data packet, the terminal feeds back an ACK. If the terminal does not correctly receive the downlink data packet, the terminal feeds back a NACK. A specific manner is as follows: A network device indicates, in downlink control information (DCI) for scheduling a PDSCH, a slot in which an ACK feedback/a NACK feedback is located by using a physical downlink shared channel (PDSCH) hybrid automatic repeat request (HARQ) feedback timing indicator field (which is generally 3 bits). In addition, a PUCCH resource indicator field value (generally 3 bits) is used, so that the terminal selects a PUCCH resource from a slot specified by the PDSCH HARQ feedback timing indicator, to determine the PUCCH resource for sending the ACK/NACK.

However, compact DCI may be introduced in a URLLC service. To improve reliability of receiving DCI, information in the DCI may be reduced. Currently, the industry proposes to compress or delete a PDSCH HARQ feedback timing indicator field, and reserve (for 2 bits) or compress a PDSCH HARQ feedback timing indicator field. If the PDSCH HARQ feedback timing indicator field is compressed or deleted, although DCI information can be simplified, flexible scheduling by the network device is reduced. In addition, when the PDSCH HARQ feedback timing indicator field is deleted, the network device needs to indicate, to the terminal by using higher-layer signaling, a slot in which an ACK feedback/a NACK feedback is located. Consequently, signaling overheads are increased. In addition, no solution of how to indicate, to the terminal in compact DCI, a resource for sending an ACK/a NACK is provided in NR.

Therefore, how to indicate, to the terminal in compact DCI, a PUCCH resource for sending an ACK/NACK is a technical problem that needs to be urgently resolved in a future communications system.

SUMMARY

Embodiments of this application provide a resource determining method, an indication method, and an apparatus, to reduce signaling overheads and ensure flexible scheduling by a network device.

To resolve the foregoing technical problem, this application provides the following technical solutions.

According to a first aspect, this application provides a resource determining method, including: receiving, by a terminal, a downlink data channel (for example, the terminal may receive the downlink data channel from a network device); determining, by the terminal, a first uplink control channel resource from a plurality of uplink control channel resources based on an index of the last symbol for the downlink data channel and a time for processing the downlink data channel by the terminal; and sending, by the terminal, acknowledgment information to the network device on the first uplink control channel resource, where the acknowledgment information is used to determine a reception status of the downlink data channel. It should be understood that the reception status may be usually correct reception or incorrect reception. That is, the reception status of the downlink data channel is whether the downlink data channel is correctly received. In other words, the acknowledgment information is used to indicate whether the downlink data channel is correctly received.

This application provides the resource determining method. The terminal determines the first uplink control channel resource from the plurality of uplink control channel resources based on the index of the last symbol for sending the sent downlink data channel and the time for processing the downlink data channel by the terminal. In this way, the network device can be prevented from carrying an explicit indication for the first uplink control channel resource in the downlink control information sent to the terminal, reducing overheads of the downlink control information. In addition, the terminal determines the first uplink control channel resource from the plurality of uplink control channel resources based on the index of the last symbol for the downlink data channel and the time for processing the downlink data channel by the terminal, so that the acknowledgment information can be fed back in a timely manner. In this application, overheads of physical layer control signaling are not increased, and flexible scheduling by the network device can be ensured.

In a possible design, the determining, by the terminal, a first uplink control channel resource from a plurality of uplink control channel resources based on an index of the last symbol for the downlink data channel and a time for processing the downlink data channel by the terminal includes: determining, by the terminal, at least one uplink control channel resource from the plurality of uplink control channel resources based on the index of the last symbol for the downlink data channel and the time for processing the downlink data channel by the terminal; and determining, by the terminal, the first uplink control channel resource from the at least one uplink control channel resource. In this case, the terminal may first determine the at least one uplink control channel resource by using the last symbol for the downlink data channel and the time for processing the downlink data channel by the terminal, and then the first uplink control channel resource may be determined from the at least one uplink control channel resource by using an implicit indication or an indication of the network device in the downlink control information. Compared with the prior art in which both the at least one uplink control channel resource and the first uplink control channel resource need to be indicated by using the downlink control information, in this embodiment, downlink control information overheads can be reduced.

In a possible design, the at least one uplink control channel resource is an available uplink control channel resource in the plurality of uplink control channel resources that follows a first symbol and that is closest to the first symbol, the first symbol is the last symbol for the downlink data channel and the $1^{st}$ symbol following the time for processing the downlink data channel by the terminal, and the available uplink control channel resource is used to send the acknowledgment information.

In a possible design, a start symbol of the available uplink control channel resource is the same as a start symbol of any uplink control channel resource, in the plurality of uplink control channel resources, that follows the first symbol; and the available uplink control channel resource belongs to the plurality of uplink control channel resources. In this way, the terminal selects, from the plurality of uplink control channel resources based on the determined first symbol and start symbols of the plurality of uplink control channel resources configured by the network device for the terminal, the available uplink control channel resource for sending the acknowledgment information.

In a possible design, all symbols of the available uplink control channel resource are flexible symbols or uplink symbols. In this case, the acknowledgment information is fed back to the network device in a time division duplexing system.

In a possible design, when an interval between the last symbol for a control channel corresponding to the downlink data channel and a start symbol for the downlink data channel is less than a first threshold, the time for processing the downlink data channel by the terminal includes a quantity of symbols occupied by the terminal to blindly detect and process downlink control information DCI for scheduling the downlink data channel. In this way, the time for processing the downlink data channel by the terminal can be adjusted.

In a possible design, the method provided in this application further includes: determining, by the terminal as a first slot, a slot associated with the at least one uplink control channel resource, where the first slot is a slot used to send the acknowledgment information. In this case, the terminal determines, based on the index of the last symbol for the downlink data channel and the time for processing the downlink data channel by the terminal, the slot used to send the acknowledgment information, and can determine an uplink control channel resource associated with the first slot as the at least one uplink control channel resource. In this way, the network device does not need to carry, in the downlink control information, a slot for indicating to send the acknowledgment information, reducing signaling overheads of the downlink control information.

In a possible design, the plurality of uplink control channel resources belong to M resource groups, uplink control channel resources in a resource group in the M resource groups have a same start symbol, and the at least one uplink control channel resource belongs to one of the M resource groups, where M is an integer greater than or equal to 1. The method provided in this application further includes: receiving, by the terminal, first indication information sent by the network device, where the first indication information is used to determine the first uplink control channel resource from the at least one uplink control channel resource. In this case, after determining the at least one uplink control channel resource based on the index of the last symbol for the downlink data channel and the time for processing the downlink data channel by the terminal, the terminal can explicitly or implicitly determine the first uplink control channel resource from the at least one uplink control channel resource based on the first indication information. In this way, regardless of whether the first indication information explicitly or implicitly indicates the first uplink control channel resource, because the at least one uplink control channel resource is implicitly determined by the terminal based on the index of the last symbol for the downlink data channel and the time for processing the downlink data channel by the terminal, signaling overheads of the downlink control information can be reduced.

In a possible design, the plurality of uplink control channel resources belong to a same resource group, and the plurality of uplink control channel resources have different start symbols. The method provided in this application further includes: receiving, by the terminal, second indication information sent by the network device, where the second indication information is used to indicate the resource group to which the plurality of uplink control channel resources belong. In this case, the terminal can determine, by using the second indication information, the resource group to which the plurality of uplink control channel resources belong, and implicitly determine the first uplink control channel resource by using the last symbol for the downlink data channel and the time for processing the downlink data channel by the terminal, reducing signaling overheads of the downlink control information.

In a possible design, the method provided in this application further includes: receiving, by the terminal, downlink control information DCI sent by the network device, where the downlink control information is used to indicate the last symbol for the downlink data channel, and the downlink control information includes a maximum of one of an uplink control channel resource indicator field and a hybrid automatic repeat request feedback timing indicator field for the downlink data channel. It should be understood that the DCI includes a maximum of one of the uplink control channel resource indicator field and the hybrid automatic repeat request feedback timing indicator field for the downlink data channel. That is, the DC includes the hybrid automatic repeat request feedback timing indicator field for the downlink data channel, the DCI includes the uplink control channel resource indicator field, or the DCI includes neither the uplink control channel resource indicator field nor the hybrid automatic repeat request feedback timing indicator field for the downlink data channel. Because the downlink control information carries a maximum of one of the uplink control channel resource indicator field and the hybrid automatic repeat request feedback timing indicator field for the downlink data channel, signaling overheads of the downlink control information is reduced, and reliability of receiving the downlink control information is improved.

In a possible design, the at least one uplink control channel resource is located in a first time unit, and an index of the first time unit is determined based on an index of a second time unit in which a second time-domain symbol is located and an offset indicated by the hybrid automatic repeat request feedback timing indicator field for the downlink data channel. The index of the second time-domain symbol is determined based on a first time and an index of the last time-domain symbol occupied by the downlink data channel.

For example, the first time may be a time for processing the downlink data channel by the terminal. Alternatively, for specific description of the first time, refer to the following embodiments.

In a possible design, when P time units are included between a third time unit and the second time unit in which the second time-domain symbol is located, and all symbols in the P time units are downlink symbols, the index of the first time unit is determined by an offset, and a P value, and the index of the second time unit in which the second time-domain symbol is located, where P is an integer greater than or equal to 1.

In a possible design, the first uplink control channel resource is an uplink control channel resource determined by an uplink control channel resource indicator field in the at least one uplink control channel resource.

According to a second aspect, this application provides a resource determining apparatus. The resource determining apparatus can implement the method in any one of the first aspect or the possible implementations of the first aspect, and therefore can also achieve beneficial effects in any one of the first aspect or the possible implementations of the first aspect. The resource determining apparatus may be a terminal or a chip applied to a terminal. The resource determining apparatus may implement the foregoing methods by using software, hardware, or hardware executing corresponding software.

The resource determining apparatus includes a receiving unit, configured to receive a downlink data channel sent by a network device; a determining unit, configured to determine a first uplink control channel resource from a plurality of uplink control channel resources based on an index of the last symbol for the downlink data channel and a time for processing the downlink data channel by the terminal; and a sending unit, configured to send acknowledgment information to the network device on the first uplink control channel resource, where the acknowledgment information is used to determine a reception status of the downlink data channel. It should be understood that the acknowledgment information is specifically used to indicate whether the downlink data channel is correctly received.

In a possible design, the determining unit is specifically configured to: determine at least one uplink control channel resource from the plurality of uplink control channel resources based on the index of the last symbol for the downlink data channel and the time for processing the downlink data channel by the terminal; and determine the first uplink control channel resource from the at least one uplink control channel resource.

In a possible design, the at least one uplink control channel resource is an available uplink control channel resource in the plurality of uplink control channel resources that follows a first symbol and that is closest to the first symbol, the first symbol is the last symbol for the downlink data channel and the $1^{st}$ symbol following the time for processing the downlink data channel by the terminal, and the available uplink control channel resource is used to send the acknowledgment information.

In a possible design, a start symbol of the available uplink control channel resource is the same as a start symbol of any uplink control channel resource, in the plurality of uplink control channel resources, that follows the first symbol; and the available uplink control channel resource belongs to the plurality of uplink control channel resources.

In a possible design, all symbols of the available uplink control channel resource are flexible symbols or uplink symbols.

In a possible design, when an interval between the last symbol for a control channel corresponding to the downlink data channel and a start symbol for the downlink data channel is less than a first threshold, the time for processing the downlink data channel by the terminal includes a quantity of symbols occupied by the terminal to blindly detect and process downlink control information DCI for scheduling the downlink data channel.

In a possible design, the determining unit is further configured to determine, as a first slot, a slot associated with the at least one uplink control channel resource, where the first slot is a slot used to send the acknowledgment information.

In a possible design, the plurality of uplink control channel resources belong to M resource groups, uplink control channel resources in a resource group in the M resource groups have a same start symbol, and the at least one uplink control channel resource belongs to one of the M resource groups. The receiving unit is further configured to receive first indication information sent by the network device, where the first indication information is used to determine the first uplink control channel resource from the at least one uplink control channel resource.

In a possible design, the plurality of uplink control channel resources belong to a same resource group, and the plurality of uplink control channel resources have different start symbols. The receiving unit is further configured to receive second indication information sent by the network device, where the second indication information is used to indicate the resource group to which the plurality of uplink control channel resources belong.

In a possible design, the receiving unit is further configured to receive downlink control information DCI sent by the network device, where the downlink control information is used to indicate the last symbol for the downlink data channel, and the downlink control information includes a maximum of one of an uplink control channel resource indicator field and a hybrid automatic repeat request feedback timing indicator field for the downlink data channel.

In a possible design, the at least one uplink control channel resource is located in a first time unit, and an index of the first time unit is determined based on an index of a second time unit in which a second time-domain symbol is located and an offset indicated by the hybrid automatic repeat request feedback timing indicator field for the downlink data channel, where an index of the second time-domain symbol is determined based on the first time and the index of the last symbol for the downlink data channel.

For content of the first time, refer to specific description in the following embodiment. Details are not described herein again. For example, the first time may be a time for processing the downlink data channel by the terminal.

In a possible design, when P time units are included between a third time unit and the second time unit in which the second time-domain symbol is located, and all symbols in the P time units are downlink symbols, the index of the first time unit is determined by an offset, P, and the index of the second time unit in which the second time-domain symbol is located, where P is a positive integer.

In a possible design, the first uplink control channel resource is an uplink control channel resource determined by an uplink control channel resource indicator field in the at least one uplink control channel resource.

According to a third aspect, this application provides a resource determining apparatus. The resource determining apparatus is a terminal or a chip applied to a terminal. The apparatus includes a communications interface and a processor. The communications interface is configured to receive a downlink data channel sent by a network device. The processor is configured to determine a first uplink control channel resource from a plurality of uplink control channel resources based on an index of the last symbol for the downlink data channel and a time for processing the downlink data channel by the terminal. The communications interface is further configured to send acknowledgment information to the network device on the first uplink control channel resource, where the acknowledgment information is used to indicate whether the downlink data channel is correctly received.

In a possible design, the processor is specifically configured to: determine at least one uplink control channel resource from the plurality of uplink control channel resources based on the index of the last symbol for the downlink data channel and the time for processing the downlink data channel by the terminal; and determine the first uplink control channel resource from the at least one uplink control channel resource.

In a possible design, the at least one uplink control channel resource is an available uplink control channel resource in the plurality of uplink control channel resources that follows a first symbol and that is closest to the first symbol, the first symbol is the last symbol for the downlink data channel and the $1^{st}$ symbol following the time for processing the downlink data channel by the terminal, and the available uplink control channel resource is used to send the acknowledgment information.

In a possible design, a start symbol of the available uplink control channel resource is the same as a start symbol of any uplink control channel resource, in the plurality of uplink control channel resources, that follows the first symbol; and the available uplink control channel resource belongs to the plurality of uplink control channel resources.

In a possible design, all symbols of the available uplink control channel resource are flexible symbols or uplink symbols.

In a possible design, when an interval between the last symbol for a control channel corresponding to the downlink data channel and a start symbol for the downlink data channel is less than a first threshold, the time for processing the downlink data channel by the terminal includes a quantity of symbols occupied by the terminal to blindly detect and process downlink control information DCI for scheduling the downlink data channel.

In a possible design, the processor is further configured to determine, as a first slot, a slot associated with the at least one uplink control channel resource, where the first slot is a slot used to send the acknowledgment information.

In a possible design, the plurality of uplink control channel resources belong to M resource groups, uplink control channel resources in a resource group in the M resource groups have a same start symbol, and the at least one uplink control channel resource belongs to one of the M resource groups. The communications interface is further configured to receive first indication information sent by the network device, where the first indication information is used to determine the first uplink control channel resource from the at least one uplink control channel resource.

In a possible design, the plurality of uplink control channel resources belong to a same resource group, and the plurality of uplink control channel resources have different start symbols. The communications interface is further configured to receive second indication information sent by the network device, where the second indication information is used to indicate the resource group to which the plurality of uplink control channel resources belong.

In a possible design, the communications interface is further configured to receive downlink control information DC sent by the network device, where the downlink control information is used to indicate the last symbol for the downlink data channel, and the downlink control information includes a maximum of one of an uplink control channel resource indicator field and a hybrid automatic repeat request feedback timing indicator field for the downlink data channel.

In a possible design, the at least one uplink control channel resource is located in a first time unit, and an index of the first time unit is determined based on an index of a second time unit in which a second time-domain symbol is located and an offset indicated by a hybrid automatic repeat request feedback timing indicator field for the downlink data channel, where an index of the second time-domain symbol is determined based on a first time (for example, a time for processing the downlink data channel by the terminal) and an index of the last time-domain symbol occupied by the downlink data channel.

In a possible design, when P time units are included between a third time unit and the second time unit in which the second time-domain symbol is located, and all symbols in the P time units are downlink symbols, the index of the first time unit is determined by an offset, P, and the index of the second time unit in which the second time-domain symbol is located, where P is a positive integer.

In a possible design, the first uplink control channel resource is an uplink control channel resource determined by an uplink control channel resource indicator field in the at least one uplink control channel resource.

Optionally, according to the third aspect, the communications interface is coupled to the processor, the resource determining apparatus further includes a bus and a memory, the memory is configured to store code and data, and the at least one processor, the communications interface, and the memory are coupled to each other.

According to a fourth aspect, this application provides a resource indication method, including: sending, by a network device, a downlink data channel to a terminal; and receiving, by the network device on a first uplink control channel resource, acknowledgment information sent by the terminal, where the acknowledgment information is used to determine a reception status of the downlink data channel (for example, used to indicate whether the downlink data channel is correctly received). The first uplink control channel resource is determined by the terminal from a plurality of uplink control channel resources based on an index of the last symbol (for example, the last time-domain symbol) for the downlink data channel and a time for processing the downlink data channel by the terminal.

In a possible design, the first uplink control channel resource is determined by the terminal from the at least one uplink control channel resource, the at least one uplink control channel resource is an available uplink control channel resource in the plurality of uplink control channel resources that follows a first symbol and that is closest to the first symbol, the first symbol is the last symbol for the downlink data channel and the $1^{st}$ symbol following the time for processing the downlink data channel by the terminal, and the available uplink control channel resource is used to send the acknowledgment information.

In a possible design, a start symbol of the available uplink control channel resource is the same as a start symbol of any uplink control channel resource, in the plurality of uplink control channel resources, that follows the first symbol; and the available uplink control channel resource belongs to the plurality of uplink control channel resources.

In a possible design, all symbols of the available uplink control channel resource are flexible symbols or uplink symbols.

In a possible design, when an interval between the last symbol for a control channel corresponding to the downlink data channel and a start symbol for the downlink data channel is less than a first threshold, the time for processing the downlink data channel by the terminal includes a quantity of symbols occupied by the terminal to blindly detect and process downlink control information DCI for scheduling the downlink data channel.

In a possible design, the plurality of uplink control channel resources belong to M resource groups, uplink control channel resources in a resource group in the M resource groups have a same start symbol, and the at least one uplink control channel resource belongs to one of the M resource groups, where M is an integer greater than or equal to 1. The method provided in this application further includes: sending, by the network device, first indication information to the terminal, where the first indication information is used to indicate to determine the first uplink control channel resource from the at least one uplink control channel resource.

In a possible design, the plurality of uplink control channel resources belong to a same resource group, and the plurality of uplink control channel resources have different start symbols. The method provided in this application further includes: sending, by the network device, second indication information to the terminal, where the second indication information is used to indicate a resource group to which the plurality of uplink control channel resources belong.

In a possible design, the method provided in this application further includes: sending, by the network device, downlink control information DCI to the terminal, where the downlink control information is used to indicate the last symbol for the downlink data channel, and the downlink control information includes a maximum of one of an uplink control channel resource indicator field and a hybrid automatic repeat request feedback timing indicator field for the downlink data channel.

In a possible design, the at least one uplink control channel resource is located in a first time unit, and an index of the first time unit is determined based on an index of a second time unit in which a second time-domain symbol is located and an offset indicated by the hybrid automatic repeat request feedback timing indicator field for the downlink data channel, where an index of the second time-domain symbol is determined based on a first time (for example, a time for processing the downlink data channel by the terminal) and an index of the last time-domain symbol occupied by the downlink data channel.

In a possible design, when P time units are included between a third time unit and the second time unit in which the second time-domain symbol is located, and all symbols in the P time units are downlink symbols, the index of the first time unit is determined by an offset, the P time units, and the index of the second time unit in which the second time-domain symbol is located, where P is an integer greater than or equal to 1, and an index of the third time unit is obtained by the index of the second time unit in which the second time-domain symbol is located, plus an index of a time unit indicated by the hybrid automatic repeat request feedback timing indicator field for the downlink data channel.

In a possible design, the first uplink control channel resource is an uplink control channel resource determined by an uplink control channel resource indicator field in the at least one uplink control channel resource.

According to a fifth aspect, this application provides a resource indication apparatus. The resource indication apparatus can implement the method in any one of the fourth aspect or the possible implementations of the fourth aspect, and therefore can also implement beneficial effects in any one of the fourth aspect or the possible implementations of the fourth aspect. The resource indication apparatus may be a network device, or a chip applied to a network device. The resource indication apparatus may implement the foregoing methods by using software, hardware, or hardware executing corresponding software.

The resource indication apparatus includes: a sending unit, configured to send a downlink data channel to a terminal; and a receiving unit, configured to receive, on a first uplink control channel resource, acknowledgment information sent by the terminal, where the acknowledgment information is used to determine a reception status of the downlink data channel, and the first uplink control channel resource is determined by the terminal based on an index of the last symbol for the downlink data channel and a time for processing the downlink data channel by the terminal.

For example, the first uplink control channel resource is determined by the terminal from a plurality of uplink control channel resources based on a first time (for example, a time for processing the downlink data channel by the terminal) and the last time-domain symbol occupied by the downlink data channel.

In a possible design, the first uplink control channel resource is determined by the terminal from the at least one uplink control channel resource, the at least one uplink control channel resource is an available uplink control channel resource in the plurality of uplink control channel resources that follows a first symbol and that is closest to the first symbol, the first symbol is the last symbol for the downlink data channel and the $1^{st}$ symbol following the time for processing the downlink data channel by the terminal, and the available uplink control channel resource is used to send the acknowledgment information.

In a possible design, a start symbol of the available uplink control channel resource is the same as a start symbol of any uplink control channel resource, in the plurality of uplink control channel resources, that follows the first symbol; and the available uplink control channel resource belongs to the plurality of uplink control channel resources.

In a possible design, all symbols of the available uplink control channel resource are flexible symbols or uplink symbols.

In a possible design, when an interval between the last symbol for a control channel corresponding to the downlink data channel and a start symbol for the downlink data channel is less than a first threshold, the time for processing the downlink data channel by the terminal includes a quantity of symbols occupied by the terminal to blindly detect and process downlink control information DCI for scheduling the downlink data channel.

In a possible design, the plurality of uplink control channel resources belong to M resource groups, uplink control channel resources in a resource group in the M resource groups have a same start symbol, and the at least one uplink control channel resource belongs to one of the M resource groups. The sending unit is further configured to send first indication information to the terminal, where the first indication information is used to determine the first uplink control channel resource from the at least one uplink control channel resource.

In a possible design, the plurality of uplink control channel resources belong to a same resource group, and the plurality of uplink control channel resources have different start symbols; and the sending unit is further configured to send second indication information to the terminal, where the second indication information is used to indicate the resource group to which the plurality of uplink control channel resources belong.

In a possible design, the sending unit is further configured to send downlink control information DCI to the terminal, where the downlink control information is used to indicate the last symbol for the downlink data channel. The downlink control information includes a maximum of one of an uplink control channel resource indicator field and a hybrid automatic repeat request feedback timing indicator field for the downlink data channel. It should be understood that, that the not including may be understood as that the downlink control information does not include the uplink control channel resource indicator field or the hybrid automatic repeat request feedback timing indicator field for the downlink data channel.

In a possible design, the at least one uplink control channel resource is located in a first time unit, and an index of the first time unit is determined based on an index of a second time unit in which a second time-domain symbol is located and an offset indicated by the hybrid automatic repeat request feedback timing indicator field for the downlink data channel, where an index of the second time-domain symbol is determined based on a first time (for example, a time for processing the downlink data channel by the terminal) and an index of the last time-domain symbol occupied by the downlink data channel.

In a possible design, when P time units are included between a third time unit and the second time unit in which the second time-domain symbol is located, and all symbols in the P time units are downlink symbols, the index of the first time unit is determined by an offset, P, and the index of the second time unit in which the second time-domain symbol is located, where P is a positive integer.

In a possible design, the first uplink control channel resource is an uplink control channel resource determined by an uplink control channel resource indicator field in the at least one uplink control channel resource.

According to a sixth aspect, this application provides a resource indication apparatus. The resource indication apparatus may be a network device or a chip applied to a network device. The resource indication apparatus includes a communications interface and a processor. The communications interface is configured for a sending unit to send a downlink data channel to a terminal. The processor is configured to receive, on a first uplink control channel resource, acknowledgment information sent by the terminal. The acknowledgment information is used to determine a reception status of the downlink data channel, and the first uplink control channel resource is determined by the terminal from a plurality of uplink control channels based on an index of the last symbol for the downlink data channel and a time for processing the downlink data channel by the terminal. It should be understood that the reception status may be usually correct reception or incorrect reception. In this case, the reception status of the downlink data channel is whether the downlink data channel is correctly received, that is, the acknowledgment information is used to indicate whether the downlink data channel is correctly received.

Optionally, the processor is configured to determine, based on the acknowledgment information received by the communications interface on the first uplink control channel resource, whether the downlink data channel is correctly received by the terminal.

In a possible design, the first uplink control channel resource is determined by the terminal from the at least one uplink control channel resource, the at least one uplink control channel resource is an available uplink control channel resource in the plurality of uplink control channel resources that follows a first symbol and that is closest to the first symbol, the first symbol is the last symbol for the downlink data channel and the $1^{st}$ symbol following the time for processing the downlink data channel by the terminal, and the available uplink control channel resource is used to send the acknowledgment information.

In a possible design, a start symbol of the available uplink control channel resource is the same as a start symbol of any uplink control channel resource, in the plurality of uplink control channel resources, that follows the first symbol; and the available uplink control channel resource belongs to the plurality of uplink control channel resources.

In a possible design, all symbols of the available uplink control channel resource are flexible symbols or uplink symbols.

In a possible design, when an interval between the last symbol for a control channel corresponding to the downlink data channel and a start symbol for the downlink data channel is less than a first threshold, the time for processing the downlink data channel by the terminal includes a quantity of symbols occupied by the terminal to blindly detect and process downlink control information DCI for scheduling the downlink data channel.

In a possible design, the plurality of uplink control channel resources belong to M resource groups, uplink control channel resources in a resource group in the M resource groups have a same start symbol, and the at least one uplink control channel resource belongs to one of the M resource groups. The sending unit is further configured to send first indication information to the terminal, where the first indication information is used to determine the first uplink control channel resource from the at least one uplink control channel resource.

In a possible design, the plurality of uplink control channel resources belong to a same resource group, and the plurality of uplink control channel resources have different start symbols. The communications interface is further configured to send second indication information to the terminal, where the second indication information is used to indicate the resource group to which the plurality of uplink control channel resources belong.

In a possible design, the communications interface is further configured to send downlink control information DCI to the terminal. The downlink control information is used to indicate the last symbol for the downlink data channel, and the downlink control information includes a maximum of one of an uplink control channel resource indicator field and a hybrid automatic repeat request feedback timing indicator field for the downlink data channel.

In a possible design, the at least one uplink control channel resource is located in a first time unit, and an index of the first time unit is determined based on an index of a second time unit in which a second time-domain symbol is located and an offset indicated by the hybrid automatic repeat request feedback timing indicator field for the downlink data channel. An index of a second time-domain symbol is determined based on a first time (for example, a time for processing the downlink data channel by the terminal) and an index of the last time-domain symbol for the downlink data channel.

In a possible design, when P time units are included between a third time unit and the second time unit in which the second time-domain symbol is located, and all symbols in the P time units are downlink symbols, the index of the first time unit is determined by an offset, P, and an index of the second time unit in which the second time-domain symbol is located, where P is a positive integer.

In a possible design, the first uplink control channel resource is an uplink control channel resource determined by an uplink control channel resource indicator field in the at least one uplink control channel resource.

Optionally, according to the sixth aspect, the communications interface is coupled to the processor, the resource indication apparatus further includes a bus and a memory, the memory is configured to store code and data, and the at least one processor, the communications interface, and the memory are coupled to each other.

According to a seventh aspect, this application provides a readable storage medium. The readable storage medium stores an instruction. When the readable storage medium is run on a device, the device is enabled to perform the resource determining method described in any one of the first aspect to the possible designs of the first aspect.

According to an eighth aspect, this application provides a readable storage medium. The readable storage medium stores an instruction. When the readable storage medium is run on a device, the device is enabled to perform the resource indication method described in any one of the fourth aspect to the possible designs of the fourth aspect.

According to a ninth aspect, this application provides a computer program product. When the computer program product is run on a computer, the computer is enabled to perform the resource determining method described in any one of the first aspect to the possible designs of the first aspect.

According to a tenth aspect, this application provides a computer program product. When the computer program product is run on a computer, the computer is enabled to perform the resource indication method described in any one of the fourth aspect to the possible designs of the fourth aspect.

According to an eleventh aspect, this application provides a chip. The chip includes a processor and an interface circuit, the interface circuit is coupled to the processor, the processor is configured to run a computer program or an instruction, to implement the resource determining method described in any one of the first aspect to the possible designs of the first aspect, and the interface circuit is configured to communicate with another module other than the chip.

According to a twelfth aspect, this application provides a chip. The chip includes a processor and an interface circuit, the interface circuit is coupled to the processor, and the processor is configured to run a computer program or an instruction, to implement the resource indication method described in any one of the fourth aspect to the possible designs of the fourth aspect.

It should be noted that the chip in this application may further include at least one memory, and the at least one memory stores an instruction or a computer program.

According to a thirteenth aspect, this application provides a communications system. The communications system includes the resource determining apparatus described in any one of the second aspect or the possible designs of the second aspect, and the resource indication apparatus described in any one of the fifth aspect or the possible designs of the fifth aspect, or includes the resource determining apparatus described in any one of the third aspect or the possible designs of the third aspect, and the resource indication apparatus described in any one of the sixth aspect or the possible designs of the sixth aspect.

According to a fourteenth aspect, an embodiment of this application provides a resource determining method, including: receiving a downlink data channel; determining a first uplink control channel resource from K uplink control channel resources based on an index of the last time-domain symbol occupied by the downlink data channel, a first time, and an offset indicated by a hybrid automatic repeat request feedback timing indicator field for the downlink data channel, where K is a positive integer; and sending, by a terminal, acknowledgment information to a network device on the first uplink control channel resource, where the acknowledgment information is used to indicate whether the downlink data channel is correctly received.

In a possible implementation, the first time is related to at least one parameter of a downlink data channel processing capability, a subcarrier spacing, a demodulation reference signal configuration, and a quantity of time-domain symbols occupied by the downlink data channel.

In a possible implementation, the determining a first uplink control channel resource from K uplink control channel resources based on an index of the last time-domain symbol occupied by the downlink data channel, a first time, and an offset indicated by a hybrid automatic repeat request feedback timing indicator field for the downlink data channel, includes: determining L uplink control channel resources from the K uplink control channel resources based on the index of the last time-domain symbol occupied by the downlink data channel, the first time, and the offset indicated by the hybrid automatic repeat request feedback timing indicator field for the downlink data channel, where L is a positive integer, and L is less than or equal to K; and determining the first uplink control channel resource from the L uplink control channel resources.

In a possible implementation, the L uplink control channel resources are located in a first time unit, and an index of the first time unit is determined based on an index of a second time unit in which a second time-domain symbol is located and the offset indicated by the hybrid automatic repeat request feedback timing indicator field for the downlink data channel; and an index of the second time-domain symbol is determined based on the first time and the index of the last time-domain symbol occupied by the downlink data channel.

In a possible implementation, when P time units are included between the second time unit and the first time unit, and all symbols in the P time units are downlink symbols, the index of the first time unit is determined based on the index of the second time unit, the offset, and P, where P is a positive integer.

In a possible implementation, the first uplink control channel resource is an uplink control channel resource in the L uplink control channel resources that is determined based on an uplink control channel resource indicator field.

According to a fifteenth aspect, this application provides a resource determining apparatus. The resource determining apparatus can implement the method in any one of the fourteenth aspect or the possible implementations of the fourteenth aspect, and therefore can also implement beneficial effects in any one of the fourteenth aspect or the possible implementations of the fourteenth aspect. The resource determining apparatus may be a terminal or a chip applied to a terminal. The resource determining apparatus may implement the foregoing methods by using software, hardware, or hardware executing corresponding software.

This application provides the resource determining apparatus. The resource determining apparatus includes: a receiving unit, configured to receive a downlink data channel; a determining unit, configured to determine a first uplink control channel resource from K uplink control channel resources based on an index of the last time-domain symbol occupied by the downlink data channel, a first time, and an offset indicated by a hybrid automatic repeat request feedback timing indicator field for the downlink data channel, where K is a positive integer; and a sending unit, configured to send acknowledgment information to a network device on the first uplink control channel resource, where the acknowledgment information is used to indicate whether the downlink data channel is correctly received.

In a possible implementation, the first time is related to at least one parameter of a downlink data channel processing capability, a subcarrier spacing, a demodulation reference signal configuration, and a quantity of time-domain symbols occupied by the downlink data channel.

In a possible implementation, the determining unit is specifically configured to: determine L uplink control channel resources from the K uplink control channel resources based on the index of the last time-domain symbol occupied by the downlink data channel, the first time, and the offset indicated by the hybrid automatic repeat request feedback timing indicator field for the downlink data channel, where L is a positive integer, and L is less than or equal to K; and determine the first uplink control channel resource from the L uplink control channel resources.

In a possible implementation, the L uplink control channel resources are located in a first time unit, and an index of the first time unit is determined based on an index of a second time unit in which a second time-domain symbol is located and the offset indicated by the hybrid automatic repeat request feedback timing indicator field for the downlink data channel; and an index of the second time-domain symbol is determined based on the first time and the index of the last time-domain symbol occupied by the downlink data channel.

In a possible implementation, when P time units are included between the second time unit and the first time unit, and all symbols in the P time units are downlink symbols, the index of the first time unit is determined based on the index of the second time unit, the offset, and P, where P is a positive integer.

In a possible implementation, the first uplink control channel resource is an uplink control channel resource in the L uplink control channel resources that is determined based on an uplink control channel resource indicator field.

This application provides a readable storage medium. The readable storage medium stores an instruction. When the readable storage medium is run on a device, the device is enabled to perform the resource determining method described in any one of the fourteenth aspect to the possible designs of the fourteenth aspect.

According to a sixteenth aspect, this application provides a resource determining apparatus. The resource determining apparatus is a terminal or a chip applied to a terminal, and the apparatus includes a communications interface and a processor. The communications interface is configured to receive a downlink data channel; the processor is configured to determine a first uplink control channel resource from K uplink control channel resources based on an index of the last time-domain symbol occupied by the downlink data channel, a first time, and an offset indicated by a hybrid automatic repeat request feedback timing indicator field for the downlink data channel, where K is a positive integer; and the communications interface is further configured to send acknowledgment information to a network device on the first uplink control channel resource, where the acknowledgment information is used to indicate whether the downlink data channel is correctly received.

In a possible implementation, the first time is related to at least one parameter of a downlink data channel processing capability, a subcarrier spacing, a demodulation reference signal configuration, and a quantity of time-domain symbols occupied by the downlink data channel.

In a possible implementation, the processor is specifically configured to determine L uplink control channel resources from the K uplink control channel resources based on the index of the last time-domain symbol occupied by the downlink data channel, the first time, and the offset indicated by the hybrid automatic repeat request feedback timing indicator field for the downlink data channel, where L is a positive integer, and L is less than or equal to K; and the processor is specifically configured to determine the first uplink control channel resource from the L uplink control channel resources.

In a possible implementation, the L uplink control channel resources are located in a first time unit, and an index of the first time unit is determined based on an index of a second time unit in which a second time-domain symbol is located and the offset indicated by the hybrid automatic repeat request feedback timing indicator field for the downlink data channel; and an index of the second time-domain symbol is determined based on the first time and the index of the last time-domain symbol occupied by the downlink data channel.

In a possible implementation, when P time units are included between the second time unit and the first time unit, and all symbols in the P time units are downlink symbols, the index of the first time unit is determined based on the index of the second time unit, the offset, and P, where P is a positive integer.

In a possible implementation, the first uplink control channel resource is an uplink control channel resource in the L uplink control channel resources that is determined based on an uplink control channel resource indicator field.

According to a seventeenth aspect, an embodiment of this application provides a resource indication method, including: sending, by a network device, a downlink data channel; and receiving, by the network device, acknowledgment information on a first uplink control channel resource, where the acknowledgment information is used to indicate whether a downlink data channel is correctly received, and the first uplink control channel resource is determined from K uplink control channel resources based on an index of the last time-domain symbol occupied by the downlink data channel, a first time, and an offset indicated by a hybrid automatic repeat request feedback timing indicator field for the downlink data channel, where K is a positive integer.

In a possible implementation, the first time is related to at least one parameter of a downlink data channel processing capability, a subcarrier spacing, a demodulation reference signal configuration, and a quantity of time-domain symbols occupied by the downlink data channel.

In a possible implementation, the first uplink control channel resource is an uplink control channel resource in L uplink control channel resources; and the L uplink control channel resources are determined from the K uplink control channel resources based on the index of the last time-domain symbol occupied by the downlink data channel, the first time, and the offset indicated by the hybrid automatic repeat request feedback timing indicator field for the downlink data channel, where L is a positive integer, and L is less than or equal to K.

In a possible implementation, when P time units are included between a second time unit and a first time unit, and all symbols in the P time units are downlink symbols, an index of the first time unit is determined based on an index of the second time unit, the offset, and P, where P is a positive integer.

In a possible implementation, the first uplink control channel resource is an uplink control channel resource in the L uplink control channel resources that is determined based on an uplink control channel resource indicator field.

This application provides a readable storage medium. The readable storage medium stores an instruction. When the readable storage medium is run on a device, the device is enabled to perform the resource indication method described in any one of the seventeenth aspect to the possible designs of the seventeenth aspect.

According to an eighteenth aspect, the resource indication apparatus is a network device or a chip applied to a network device. The apparatus includes a communications interface and a processor. The communications interface is configured to: send a downlink data channel; and receive acknowledgment information on a first uplink control channel resource, where the acknowledgment information is used to indicate whether the downlink data channel is correctly received, and the first uplink control channel resource is determined from K uplink control channel resources based on the last time-domain symbol for the downlink data channel and a time for processing the downlink data channel by the terminal.

In an example, the resource indication apparatus includes a sending unit, configured to send a downlink data channel; and a receiving unit, configured to receive acknowledgment information on a first uplink control channel resource, where the acknowledgment information is used to indicate whether the downlink data channel is correctly received, and the first uplink control channel resource is determined from K uplink control channel resources by using an index of the last time-domain symbol occupied by the downlink data channel, a first time, and an offset indicated by a hybrid automatic repeat request acknowledgment feedback timing indicator field for the downlink data channel, where K is a positive integer.

In a possible implementation, the first time is related to at least one parameter of a downlink data channel processing capability, a subcarrier spacing, a demodulation reference signal configuration, and a quantity of time-domain symbols occupied by the downlink data channel.

In a possible implementation, the first uplink control channel resource is an uplink control channel resource in L uplink control channel resources; and the L uplink control channel resources are determined from the K uplink control channel resources based on the index of the last time-domain symbol occupied by the downlink data channel, the first time, and the offset indicated by the hybrid automatic repeat request feedback timing indicator field for the downlink data channel, where L is a positive integer, and L is less than or equal to K. The first uplink control channel resource is determined from the L uplink control channel resources.

In a possible implementation, the L uplink control channel resources are located in a first time unit, and an index of the first time unit is determined based on an index of a second time unit in which a second time-domain symbol is located and the offset indicated by the hybrid automatic repeat request feedback timing indicator field for the downlink data channel; and an index of the second time-domain symbol is determined based on the first time and the index of the last time-domain symbol occupied by the downlink data channel.

In a possible implementation, when P time units are included between the second time unit and the first time unit, and all symbols in the P time units are downlink symbols, the index of the first time unit is determined based on the index of the second time unit, the offset, and P, where P is a positive integer.

In a possible implementation, the first uplink control channel resource is an uplink control channel resource in the L uplink control channel resources that is determined based on an uplink control channel resource indicator field.

In another example, the resource indication apparatus is a network device or a chip applied to a network device. The apparatus includes a communications interface and a processor. The communications interface is configured to: send a downlink data channel; and receive acknowledgment information on a first uplink control channel resource, where the acknowledgment information is used to indicate whether the downlink data channel is correctly received, and the first uplink control channel resource is determined from K uplink control channel resources based on the last time-domain symbol for the downlink data channel and a time for processing the downlink data channel by the terminal.

It should be understood that for a specific manner of determining the first uplink control channel resource, refer to the description in the seventeenth aspect. The specific manner is not limited in this embodiment of this application.

According to a nineteenth aspect, an embodiment of this application provides a resource determining method, including: receiving, by a terminal, a downlink data channel; and sending, by the terminal, acknowledgment information to a network device on a first uplink control channel resource, where the acknowledgment information is used to indicate whether the downlink data channel is correctly received. The first uplink control channel resource is an uplink control channel resource in the L uplink control channel resources. The L uplink control channel resources are located in a first time unit. When P time units are included between the first time unit and a second time unit in which a second time-domain symbol is located, and the P time units are corresponding to downlink symbols, an index of the first time unit is determined by an offset, the P time units, and an index of the second time unit in which the second time-domain symbol is located, where P is an integer greater than or equal to 1. An index of the second time-domain symbol is related to an index of the last time-domain symbol occupied by the downlink data channel.

In a possible design, when Q symbols in symbols corresponding to the P time units are not downlink symbols, the index of the first time unit is determined based on an index of a second time unit in which the second time-domain symbol is located and an offset indicated by a hybrid automatic repeat request feedback timing indicator field for the downlink data channel. The index of the second time-domain symbol is determined based on a first time and an index of the last time-domain symbol occupied by the downlink data channel, where Q is a positive integer.

In a possible design, the first time is related to at least one parameter of a downlink data channel processing capability, a subcarrier spacing, a demodulation reference signal configuration, and a quantity of time-domain symbols occupied by the downlink data channel.

In a possible design, the first uplink control channel resource is an uplink control channel resource in the L uplink control channel resources that is indicated by an uplink control channel resource indicator field.

According to a twentieth aspect, an embodiment of this application provides a resource determining apparatus. The resource determining apparatus includes: a receiving unit, configured to receive a downlink data channel; and a sending unit, configured to send acknowledgment information to a network device on a first uplink control channel resource. The acknowledgment information is used to indicate whether the downlink data channel is correctly received, and the first uplink control channel resource is an uplink control channel resource in L uplink control channel resources. The L uplink control channel resources are located in a first time unit. When P time units are included between the first time unit and a second time unit in which a second time-domain symbol is located, and the P time units are corresponding to downlink symbols, an index of the first time unit is determined by an offset, the P time units, and an index of the second time unit in which the second time-domain symbol is located, where P is an integer greater than or equal to 1, and an index of the second time-domain symbol is related to an index of the last time-domain symbol occupied by the downlink data channel.

Specifically, for explanation of the first uplink control channel resource herein according to the resource determining apparatus in the twentieth aspect herein, refer to description in the nineteenth aspect corresponding to the resource determining apparatus. Details are not described herein again.

According to a twenty-first aspect, an embodiment of this application provides a resource indication method, including: sending a downlink data channel; and receiving acknowledgment information on a first uplink control channel resource. The acknowledgment information is used to indicate whether the downlink data channel is correctly received, and the first uplink control channel resource is an uplink control channel resource in L uplink control channel resources. The L uplink control channel resources are located in a first time unit. When P time units are included between the first time unit and a second time unit in which a second time-domain symbol is located, and the P time units are corresponding to downlink symbols, an index of the first time unit is determined by an offset, the P time units, and an index of a second time unit in which the second time-domain symbol is located, where P is an integer greater than or equal to 1, and the index of the second time-domain symbol is related to an index of the last time-domain symbol occupied by the downlink data channel.

It should be understood that, for explanation of the first uplink control channel resource in the twenty-first aspect, refer to the description in the nineteenth aspect. Details are not described herein again.

According to a twenty-second aspect, an embodiment of this application provides a resource indication apparatus, including a sending unit, configured to send a downlink data channel; and a receiving unit, configured to receive acknowledgment information on a first uplink control channel resource. The acknowledgment information is used to indicate whether the downlink data channel is correctly received, and the first uplink control channel resource is an uplink control channel resource in L uplink control channel resources. The L uplink control channel resources are located in a first time unit. When P time units are included between the first time unit and a second time unit in which a second time-domain symbol is located, and the P time units are corresponding to downlink symbols, an index of the first time unit is determined by an offset, the P time units, and an index of the second time unit in which the second time-domain symbol is located, where P is an integer greater than or equal to 1, and the index of the second time-domain symbol is related to an index of the last time-domain symbol occupied by the downlink data channel.

It should be understood that, for explanation of the first uplink control channel resource in the twenty-second aspect, refer to the description in the nineteenth aspect. Details are not described herein again.

According to a twenty-third aspect, an embodiment of this application provides a resource determining method, including: receiving, by a terminal, a downlink data channel; and determining, by the terminal, a first uplink control channel resource from K uplink control channel resources based on the last time-domain symbol occupied by the downlink data channel; and sending, by the terminal, acknowledgment information to a network device on the first uplink control channel resource, where the acknowledgment information is used to indicate whether the downlink data channel is correctly received.

In a possible implementation, the determining, by the terminal, a first uplink control channel resource from K uplink control channel resources based on the last time-domain symbol occupied by the downlink data channel includes: determining L uplink control channel resources from the K uplink control channel resources based on the last time-domain symbol occupied by the downlink data channel; and determining, by the terminal, the first uplink control channel resource from the L uplink control channel resources, where L is a positive integer, and L is less than or equal to K.

In a possible implementation, the K uplink control channel resources are located in a first time unit, and an index of the first time unit is determined based on an index of a third time unit in which a third time-domain symbol is located and an offset indicated by a hybrid automatic repeat request feedback timing indicator field (PDSCH-to-HARQ_feedback timing indicator) of the downlink data channel. The third time-domain symbol is the last time-domain symbol occupied by the downlink data channel.

When P time units are included between the first time unit and the third time unit in which the third time-domain symbol is located, and all symbols in the P time units are downlink symbols, the index of the first time unit is determined by an offset, P, and an index of the third time unit in which the third time-domain symbol is located, where P is a positive integer.

Specifically, the index of the first time unit is determined based on the offset plus the P time units plus the index of the third time unit in which the third time-domain symbol is located.

According to a twenty-fourth aspect, an embodiment of this application provides a resource determining apparatus, including: a receiving unit, configured to receive a downlink data channel; and a determining unit, configured to determine a first uplink control channel resource from K uplink control channel resources based on the last time-domain symbol occupied by the downlink data channel. The determining unit is configured to send acknowledgment information to a network device on the first uplink control channel resource. The acknowledgment information is used to indicate whether the downlink data channel is correctly received.

For explanation of the first uplink control channel resource described in the twenty-fourth aspect, refer to the explanation of the first uplink control channel resource in the twenty-third aspect. Details are not described herein again.

According to a twenty-fifth aspect, an embodiment of this application provides a resource indication method, including: sending a downlink data channel; and receiving acknowledgment information on a first uplink control channel resource. The acknowledgment information is used to indicate whether the downlink data channel is correctly received. The first uplink control channel resource is determined from K uplink control channel resources based on the last time-domain symbol occupied by the downlink data channel. It should be understood that, for explanation of the first uplink control channel resource herein, refer to the explanation of the first uplink control channel resource according to the resource determining method in the twentieth aspect. Details are not described herein again.

According to a twenty-sixth aspect, an embodiment of this application provides a resource indication apparatus, including: a sending unit, configured to send a downlink data channel; and a receiving unit, configured to receive acknowledgment information on a first uplink control channel resource. The acknowledgment information is used to indicate whether the downlink data channel is correctly received. The first uplink control channel resource is determined from K uplink control channel resources based on the last time-domain symbol occupied by the downlink data channel. It should be understood that, for explanation of the first uplink control channel resource herein, refer to the explanation of the first uplink control channel resource according to the resource determining method in the twentieth aspect. Details are not described herein again.

This application provides a readable storage medium. The readable storage medium stores an instruction. When the readable storage medium is run on a device, the device is enabled to perform the method described in any possible design of the fourteenth aspect, and the method described in any possible implementation of the seventeenth aspect, the nineteenth aspect, the twenty-first aspect, the twenty-third aspect, or the twenty-fifth aspect.

This application provides a computer program product. When the computer program product is run on a computer, the computer is enabled to perform the method described in any possible design of the fourteenth aspect, and the method described in any possible implementation of the seventeenth aspect, the nineteenth aspect, the twenty-first aspect, the twenty-third aspect, or the twenty-fifth aspect.

This application provides a chip. The chip includes a processor and an interface circuit. The interface circuit is coupled to the processor, and the processor is configured to run a computer program or an instruction, to implement the method described in any possible design of the fourteenth aspect, and the method described in any possible implementation of the seventeenth aspect, the nineteenth aspect, the twenty-first aspect, the twenty-third aspect, or the twenty-fifth aspect. The interface circuit is configured to communicate with another module other than the chip.

DESCRIPTION OF EMBODIMENTS

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should be noted that, in this application, the term "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

A network architecture and a service scenario that are described in the embodiments of this application are intended to describe the technical solutions in the embodiments of this application more clearly, and do not constitute a limitation to the technical solutions provided in the embodiments of this application. A person of ordinary skill in the art may know that, with evolution of the network architecture and emergence of new service scenarios, the technical solutions provided in the embodiments of this application are also applicable to similar technical problems.

Figure 1:
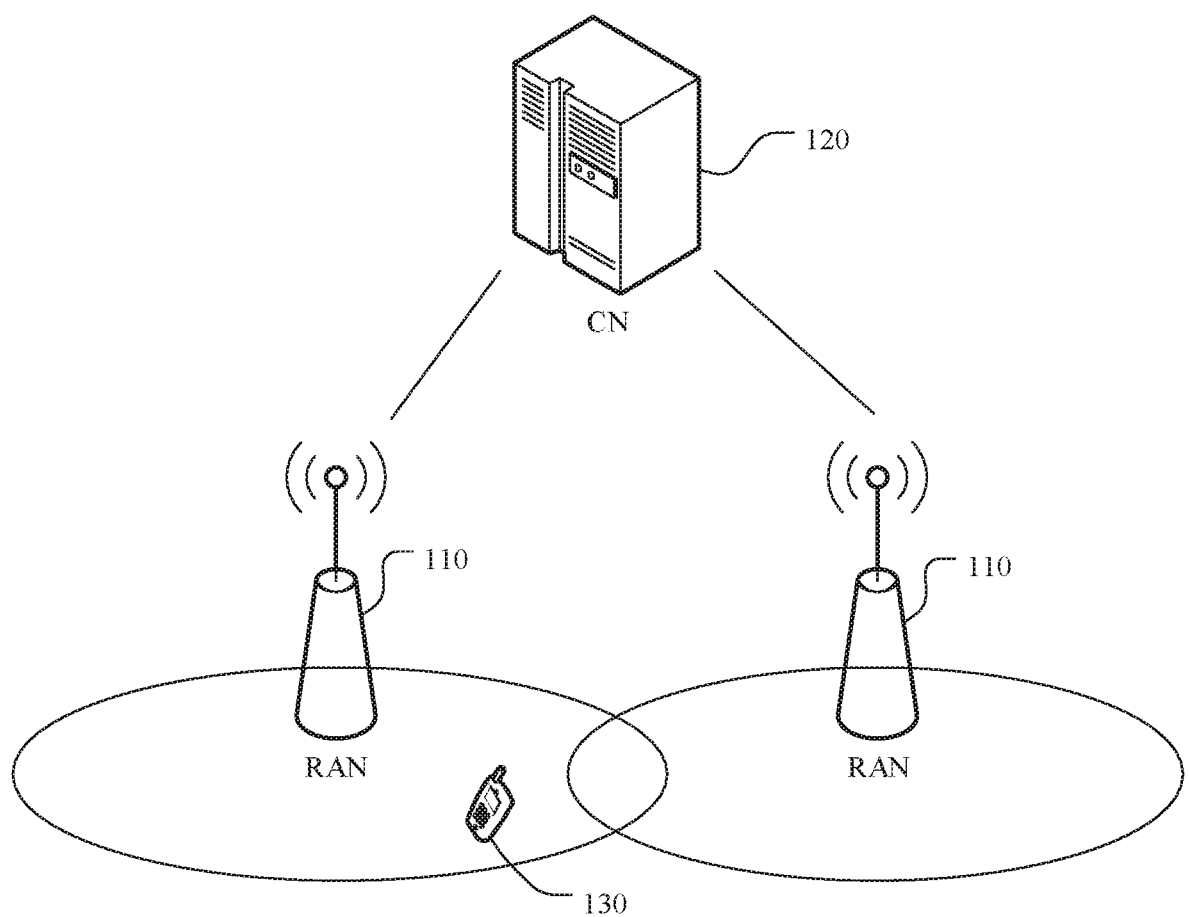
FIG. 1 is a schematic diagram of a communications system according to this application.

FIG. 1 is a schematic architectural diagram of a mobile communications system to which an embodiment of this application is applied. As shown in FIG. 1, in the mobile communications system, a terminal 130 is connected to a wireless network, to obtain a service from an external network (for example, the internet) over the wireless network or communicate with another terminal over the wireless network. The wireless network includes a radio access network (RAN) 110 and a core network (CN) 120. The RAN 110 is configured to connect the terminal 130 to the wireless network, and the CN 120 is configured to manage a terminal device and provide a gateway for communication with an external network. The RAN 110 may include a radio access network device.

The terminal is connected to the radio access network device in a wireless manner, so that the terminal is connected to the core network by using the radio access network device, and the radio access network device is connected to a core network device in a wireless or wired manner. The core network device and the radio access network device may be different independent physical devices, a function of the core network device and a logical function of the radio access network device may be integrated into one physical device, or some functions of the core network device and some functions of the radio access network device may be integrated into one physical device. The terminal may be located in a fixed position, or may be mobile. FIG. 1 is merely a schematic diagram. The mobile communications system may further include other network devices, for example, may further include a wireless relay device and a wireless backhaul device, which are not drawn in FIG. 1. Quantities of core network devices, radio access network devices, and terminals included in the mobile communications system are not limited in this embodiment of this application.

The radio access network device and the terminal may be deployed on land, including indoor, outdoor, handheld, or vehicle-mounted; may be deployed on water; or may be deployed on an aircraft, a balloon, and an artificial satellite in the air. An application scenario of the radio access network device and an application scenario of the terminal device are not limited in this embodiment of this application.

The terminal may also be referred to as user equipment (UE), an access terminal, a subscriber unit, a subscriber station, a mobile station, a remote station, a remote terminal, a mobile device, a user terminal, a terminal, a wireless communications device, a user agent, a user apparatus, or the like. The terminal may be a station (STA) in a wireless local area network (WLAN); or may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, a terminal in a next-generation communications system, for example, a fifth-generation (5G) communications network, a terminal in a future evolved public land mobile network (PLMN), or the like.

In an example, in this embodiment of the present invention, the terminal may alternatively be a wearable device. The wearable device may also be referred to as a wearable intelligent device, and is a general term of wearable devices such as glasses, gloves, watches, clothes, and shoes that are intelligently designed and developed for daily wear by using wearable technologies. The wearable device is a portable device that is directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or some functions without depending on smartphones, for example, smartwatches or smartglasses, and devices that focus on only one type of application function and need to work with other devices such as smartphones, for example, various smart bands or smart jewelry for monitoring physical signs.

The radio access network device is an access device used by the terminal to connect to the mobile communications system in a wireless manner, and may be a network device. For example, the network device may be an access point (AP) in a WLAN, a base transceiver station (BTS) in a global system for mobile communications (GSM) or code division multiple access (CDMA), a NodeB (NB) in wideband code division multiple access (WCDMA), an evolved NodeB (eNB or eNodeB) in long term evolution (LTE), a relay station or an access point, a vehicle-mounted device, a wearable device, a network device in a future 5G network, a network device in a future evolved PLMN network, or the like.

In addition, in this embodiment of the present invention, the network device provides a service for a cell, and the terminal communicates with the network device by using a transmission resource (for example, a frequency-domain resource or a time-frequency resource) used in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. The small cell is characterized by small coverage and low transmit power, and is applicable to providing of a high-rate data transmission service.

The method and the apparatus that are provided in this embodiment of this application may be applied to a terminal, and the terminal includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems, for example, a Linux operating system, a Unix operating system, an Android operating system, an iOS operating system, or a Windows operating system, that process a service by using a process. The application layer includes applications such as a browser, an address book, word processing software, and instant messaging software. In addition, in this embodiment of the present invention, a specific structure of a body for performing the resource determining method is not particularly limited in this embodiment of the present invention, provided that a program that records code for the resource determining method in this embodiment of the present invention can be run to perform communication according to the resource determining method in this embodiment of the present invention. For example, the resource determining method in this embodiment of the present invention may be executed by the terminal, or may be executed by a function module that can invoke a program and execute the program in the terminal.

In addition, aspects or features in this embodiment of the present invention may be implemented as a method, an apparatus or a product that uses standard programming and/or engineering technologies. The term "product" used in this application may cover a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

Figure 2:
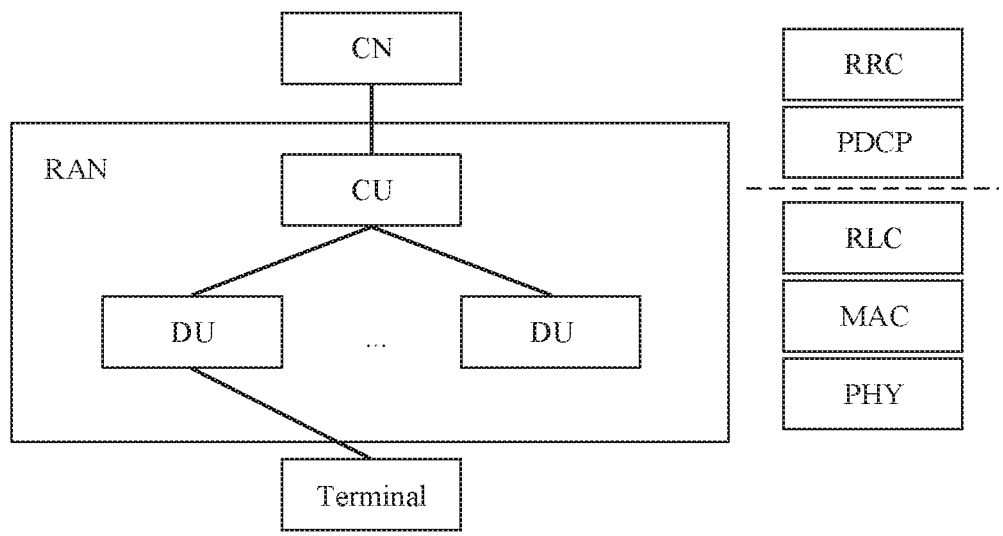
FIG. 2 is a schematic structural diagram of a base station according to this application.

A future access network may be implemented by using a cloud radio access network (C-RAN) architecture. In a possible manner, a protocol stack architecture and a function of a conventional base station are divided into two parts: One part is referred to as a centralized unit (CU), and the other part is referred to as a distributed unit (DU). However, an actual manner for distributing the CU and the DU is relatively flexible. For example, CU parts of a plurality of base stations are integrated to form a comparatively large-scale functional entity. FIG. 2 is a schematic diagram of a network architecture according to an embodiment of this application. As shown in FIG. 2, the network architecture includes a core network (CN) device and an access network (for example, a radio access network (RAN)) device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, may be integrated into the baseband apparatus, or some remote parts are integrated into the baseband apparatus. For example, in an LTE communications system, the RAN device (eNB) includes a baseband apparatus and a radio frequency apparatus. The radio frequency apparatus may be arranged remotely relative to the baseband apparatus (for example, a radio remote unit (RRU) is arranged relative to a baseband processing unit (BBU)). The RAN device is implemented by one node. The node is configured to implement functions of protocol layers such as a radio resource control (RRC) layer, a packet data convergence protocol (PDCP) layer, a radio link control (RLC) layer, and a medium access control (MAC) layer. For another example, in an evolved structure, the baseband apparatus may include a centralized unit (CU) and a distributed unit (DU), and a plurality of DUs may be controlled by one CU. As shown in FIG. 2, division for the CU and the DU may be performed based on a protocol layer of a wireless network. For example, functions of a packet data convergence protocol layer and a protocol layer above the packet data convergence protocol layer are set on the CU, and functions of protocol layers below the PDCP layer are set on the DU, for example, functions of the radio link control (RLC) layer and the media access control layer are set on the DU.

Division based on the protocol layer is merely an example. Alternatively, division may be performed based on another protocol layer, for example, the RLC layer. Functions of the RLC layer and a layer above the RLC layer are set on the CU, and functions of a protocol layer below the RLC layer are set on the DU. Alternatively, division is performed based on a specific protocol layer. For example, some functions of the RLC layer and functions of a protocol layer above the RLC layer are set on the CU, and remaining functions of the RLC layer and functions of a protocol layer below the RLC layer are set on the DU. In addition, division may alternatively be performed in another manner, for example, division is performed based on a delay. A function whose processing time needs to meet a delay requirement is set on the DU, and a function whose processing time does not need to meet the delay requirement is set on the CU.

In addition, the radio frequency apparatus may be disposed remotely from the DU, or may be integrated into the DU. Alternatively, a part of the radio frequency apparatus is disposed remotely from the DU, and the other is integrated into the DU. This is not limited herein.

Figure 3:
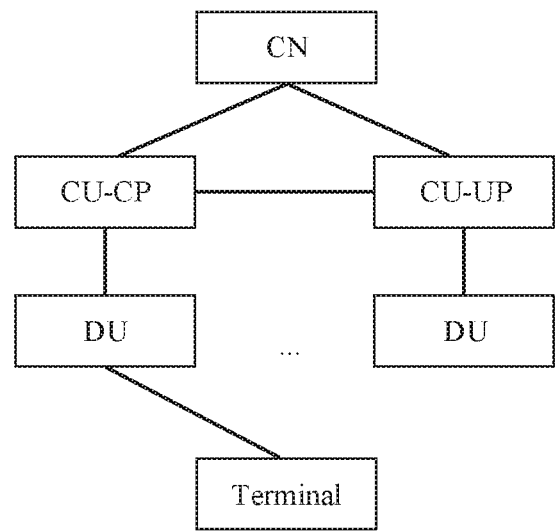
FIG. 3 is a schematic structural diagram of another base station according to this application.

In addition, compared with the architecture shown in FIG. 2, referring to FIG. 3, a control plane (CP) and a user plane (UP) of the CU may be separated and implemented by using different entities: a CU-control plane entity (CU-CP entity) and a CU-user plane entity (CU-UP entity).

In the foregoing network architecture, signaling/data generated by the CU may be sent to a terminal by using the DU, or signaling/data generated by a terminal may be sent to the CU by using the DU. The DU may not parse the signaling/data, but directly encapsulate the signaling/data by using a protocol layer and transparently transmit the signaling/data to the terminal or the CU. In the following embodiment, if transmission of the signaling/data between the DU and the terminal is described, sending or receiving the signaling/data by the DU includes such a scenario. For example, signaling of an RRC or a PDCP layer is finally processed as signaling/data of a physical layer (PHY) and sent to the terminal, or is converted from received signaling/data of a PHY layer. In this architecture, it may be considered that the signaling/data of the RRC or PDCP layer is sent by the DU or is sent by the DU and a radio frequency.

In the foregoing embodiment, the CU is classified as a network device in the RAN. In addition, the CU may alternatively be classified as a network device in the CN. Classification of the CU is not limited herein.

The apparatus in the following embodiments of this application may be located in the terminal device or the network device based on a function implemented by the apparatus. When the foregoing CU-DU structure is used, the network device may be a CU node, a DU node, or a RAN device including functions of a CU node and a DU node.

A resource determining method in this application may be performed by a terminal, or may be performed by a resource determining apparatus (for example, a chip) applied to a terminal. A resource indication method in this application may be performed by a network device, or may be performed by a resource indication apparatus (for example, a chip) applied to a network device. In the following embodiments, an example in which a resource determining method is performed by a terminal and a resource indication method is performed by a network device is used.

Figure 4:
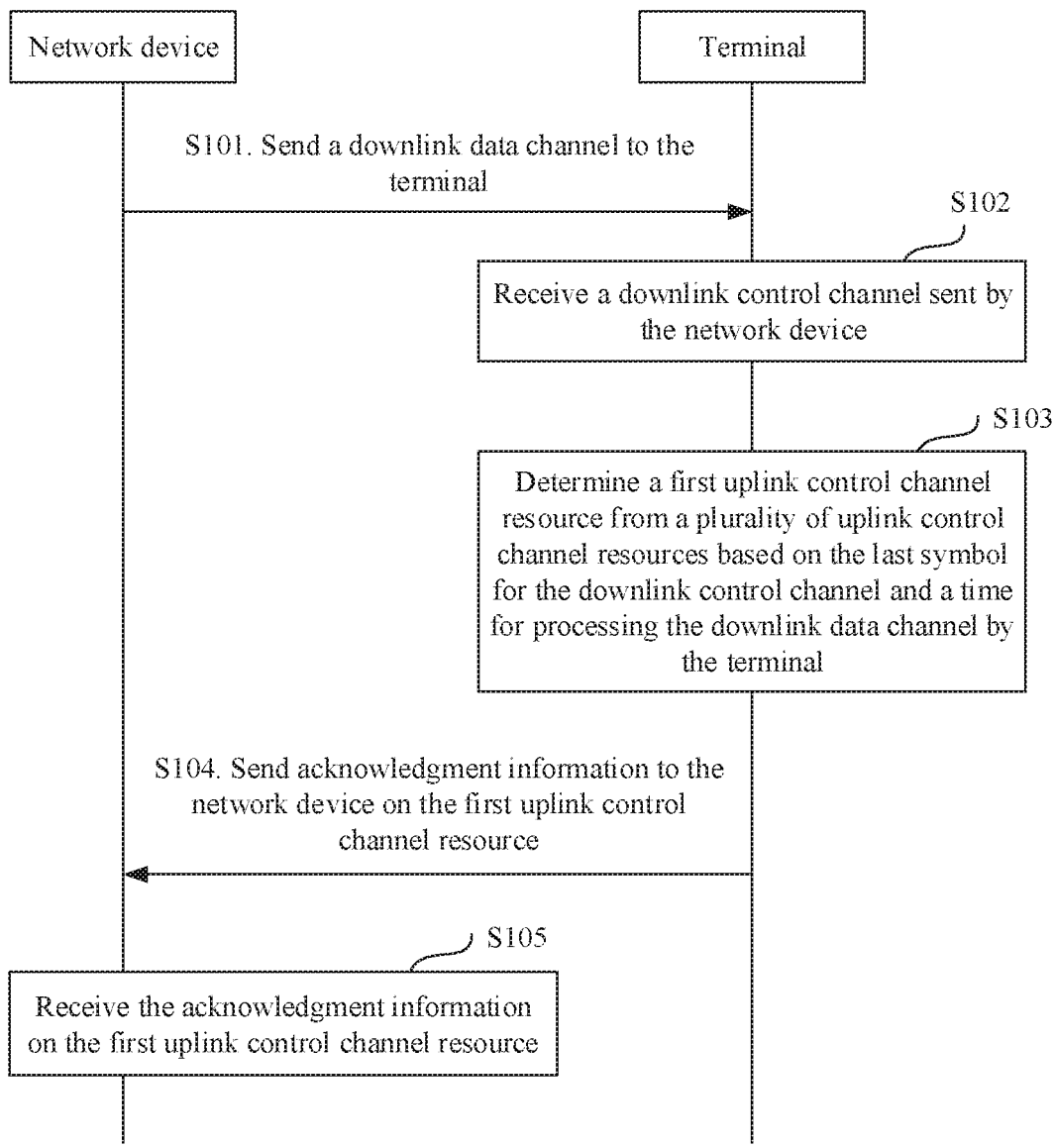
FIG. 4 is a schematic flowchart 1 of a resource indication method and a resource determining method according to this application.

FIG. 4 is a schematic flowchart of a resource indication method and a resource determining method according to this application. The method includes the following steps.

S101. The network device sends a downlink data channel to the terminal.

For example, the downlink data channel in this embodiment of this application may be a physical downlink shared channel (PDSCH).

For example, a time-domain position of the downlink data channel in this embodiment of this application may be sent to the terminal by using downlink control information. The downlink control information is carried on a downlink control channel (for example, a physical downlink control channel (PDCCH)).

In other words, step S101 in this application may be implemented in the following manner: The network device sends downlink control information DCI to the terminal, where the DCI is used to indicate at least the last symbol for the downlink data channel.

Optionally, the DCI may include an end symbol for the downlink data channel that may also be referred to as the last symbol for the downlink data channel.

In an example, the DCI may include a start symbol for the downlink data channel and a time-domain length of the downlink data channel. In this way, after receiving the DCI used to indicate the last symbol for the downlink data channel, the terminal can determine the end symbol for the downlink data channel based on the start symbol for the downlink data channel and the time-domain length of the downlink data channel.

For example, the start symbol for the PDSCH included in the DCI is a symbol 2 in a slot 1, and the time-domain length of the PDSCH included in the DCI is nine symbols. In this way, the terminal can determine that the last symbol for the downlink data channel is a symbol 10 in the slot 1.

In another example, position information of the downlink data channel may include an end symbol for the downlink data channel.

Specifically, the DCI in this application is compact DCI. The compact DCI includes a maximum of one of a hybrid automatic repeat request feedback timing indicator field for processing the downlink data channel by the terminal and an uplink control channel resource indicator field.

It may also be understood that the compact DCI includes a maximum of one of the uplink control channel resource indicator field and the hybrid automatic repeat request acknowledgement (HARQ-ACK) feedback timing indicator field for processing the downlink data channel by the terminal.

S102. The terminal receives a downlink control channel sent by the network device.

For example, the terminal receives the downlink control information on the downlink control channel sent by the network device.

When the network device sends the DCI to the terminal by using the downlink control channel, the terminal may receive, on the downlink control channel (for example, the PDCCH), the DCI sent by the network device.

S103. The terminal determines a first uplink control channel resource from a plurality of (for example, K, where K is a positive integer) uplink control channel resources based on an index of the last symbol for the downlink control channel and a time for processing the downlink data channel by the terminal.

It should be understood that, in this embodiment of this application, the last symbol for the downlink control channel may be the last time-domain symbol occupied by the downlink data channel.

Optionally, the time for processing the downlink data channel by the terminal refers to a quantity of symbols occupied by the terminal to demodulate the downlink data channel and generate acknowledgment information.

Optionally, the plurality of uplink control channel resources in this application may be used to send the acknowledgment information, and the plurality of uplink control channel resources are all or some of all uplink control channel resources that are by the network device for the terminal and that can be used to send the acknowledgment information.

S104. The terminal sends the acknowledgment information to the network device on the first uplink control channel resource.

Specifically, the acknowledgment information in this embodiment of this application is used to indicate whether the downlink data channel is correctly received.

If the terminal correctly receives data sent on the downlink data channel, the terminal feeds back an ACK to the network device on the first uplink control channel resource. If the terminal does not correctly receive the data sent on the downlink data channel, the terminal feeds back a NACK to the network device on the first uplink control channel resource.

S105. The network device receives the acknowledgment information on the first uplink control channel resource.

This application provides the resource determining method. The terminal determines the first uplink control channel resource from the plurality of uplink control channel resources based on the last symbol for the sent downlink data channel and the time for processing the downlink data channel by the terminal. In this way, the network device can be prevented from carrying an explicit indication for the first uplink control channel resource in the downlink control information sent to the terminal, reducing overheads of the downlink control information. In addition, the terminal determines the first uplink control channel resource from the plurality of uplink control channel resources based on the index of the last symbol for the downlink data channel and the time for processing the downlink data channel by the terminal, so that the acknowledgment information can be fed back in a timely manner. In this application, overheads of physical layer control signaling are not increased, and flexible scheduling by the network device can be ensured.

Optionally, after step S105 is performed, the method provided in this application further includes: determining, by the network device based on the acknowledgment information received on the first uplink control channel resource, whether the downlink data channel is correctly received.

Specifically, if the network device receives, on the first uplink control channel resource, the ACK fed back by the terminal, the network device determines that the terminal correctly parses the data that is on the downlink data channel. If the network device receives the NACK on the first uplink control channel resource, the network device determines that the terminal does not correctly receive the downlink data channel. Specifically, the network device determines that the terminal does not correctly receive the data that is on the downlink data channel.

Figure 5:
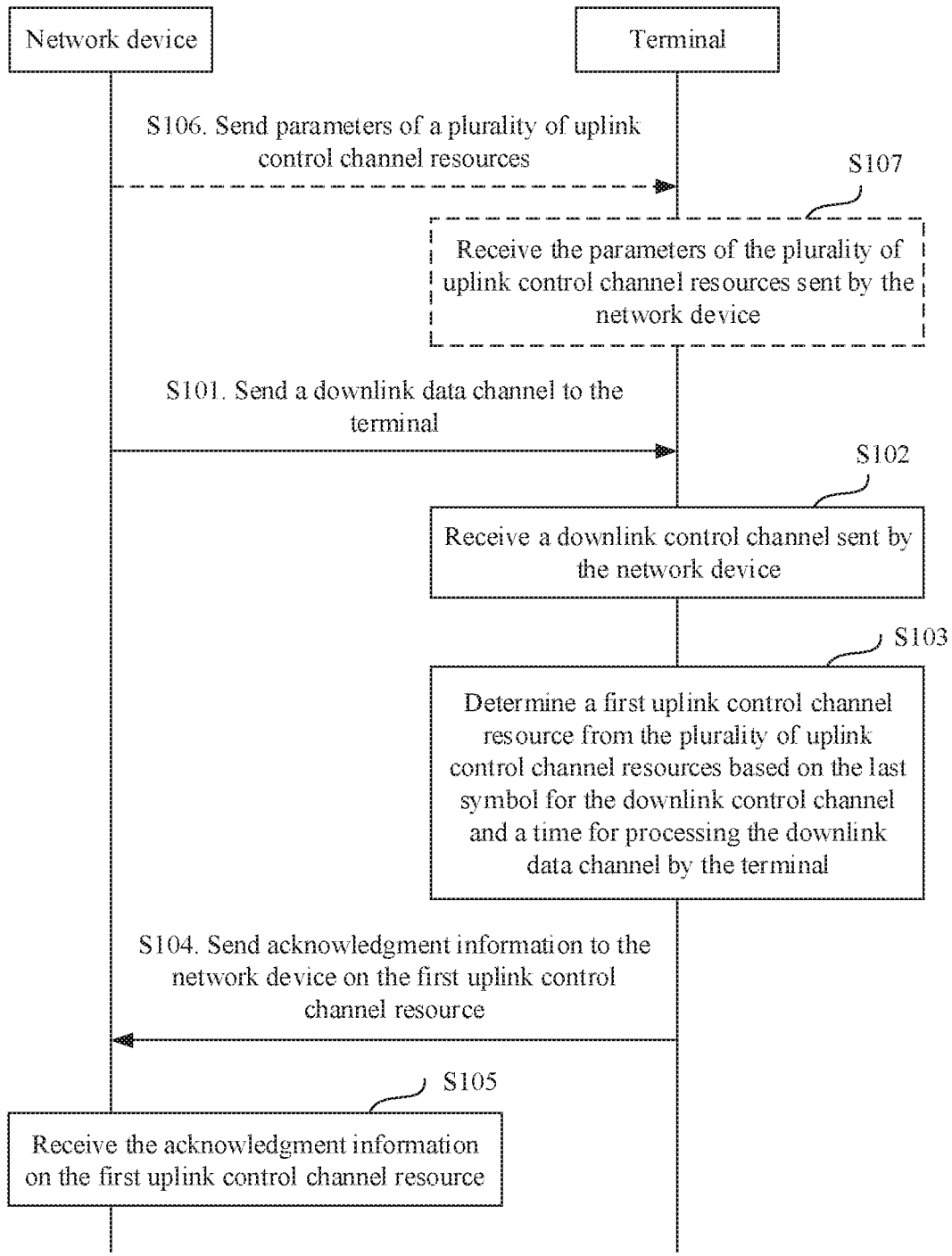
FIG. 5 is a schematic flowchart 2 of a resource indication method and a resource determining method according to this application.

In a possible embodiment, as shown in FIG. 5, the method provided in this embodiment of this application further includes the following steps:

S106. The network device sends parameters of a plurality of uplink control channel resources to the terminal. The parameters of the plurality of uplink control channel resources are used by the terminal to determine the plurality of uplink control channel resources that can be used to feed back the acknowledgment information.

Specifically, the network device configures, for the terminal by using RRC signaling, the plurality of uplink control channel resources used to feed back the acknowledgment information.

It may also be understood that the plurality of uplink control channel resources in this embodiment of this application constitute a set of uplink control channel resources.

For example, the uplink control channel resource may be a physical uplink control channel (PUCCH) resource.

Optionally, parameters of the uplink control channel resource include at least a start symbol (also referred to as a head symbol or the 1$^{st}$ symbol), a time-domain length, a frequency-domain position, a cyclic shift index, and the like of the uplink control channel resource.

The start symbol of the uplink control channel resource is an index of a symbol in a time unit, and ranges from 0 to (X−1), where X is a quantity of OFDM (orthogonal frequency-division multiplexing) symbols included in the time unit.

The time unit may be one slot (X=14 when there is a normal CP cyclic prefix, and X=12 when there is an extended CP), one half-slot (X=7 when there is a normal CP, and X=6 when there is an extended CP), and X OFDM symbols (X is configured by using a higher layer parameter).

For example, the acknowledgment information in this application may be a hybrid automatic repeat request (HARQ-ACK or a HARQ-NACK).

In this application, the start symbol of the uplink control channel resource may be a symbol index of the uplink control channel resource in one slot, or may be represented as a relative position corresponding to the last symbol for the downlink data channel.

Figure 6:
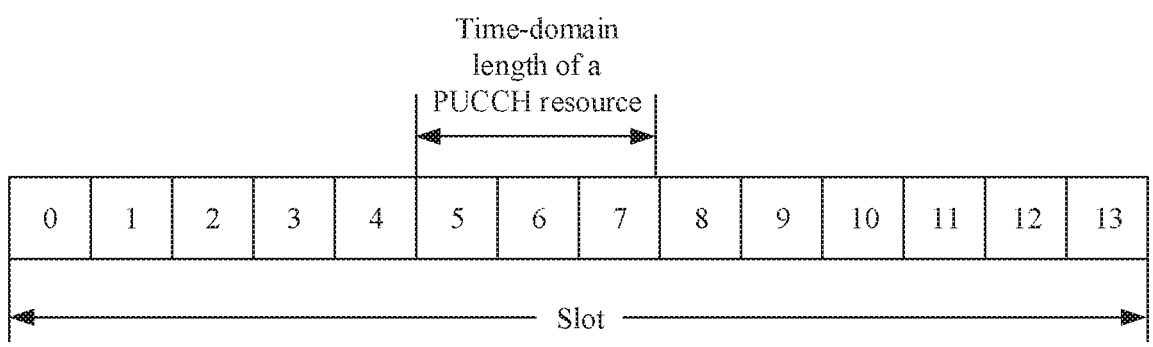
FIG. 6 is a schematic diagram 1 of an uplink control channel resource according to this application.

For example, as shown in FIG. 6, using an example in which one slot includes 14 symbols, for example, symbols 0 to 13 in FIG. 6, as shown in FIG. 6, a start symbol of a PUCCH resource may be the symbol 5.

A frequency-domain position of the uplink control channel resource refers to specific subcarriers or specific physical resource blocks (PRB) on which the uplink control channel resource is located in frequency domain.

The terminal may determine an end symbol (also referred to as the last symbol or a tail symbol) of the uplink control channel resource with reference to the time-domain length of the uplink control channel resource and the starting symbol of the uplink control channel resource, to determine the time-domain position of the uplink control channel resource.

For example, as shown in FIG. 6, in an example in which the time-domain length of the PUCCH resource is three symbols, when the start symbol of the PUCCH resource is the symbol 5, the PUCCH resource includes the symbol 5, the symbol 6, and the symbol 7.

It may be understood that the PUCCH resource in this application includes one or more symbols. The one or more symbols included in the PUCCH resource may be associated with one slot, or may be associated with a plurality of slots. In other words, one PUCCH resource in this application may be associated with one or more slots.

Figure 7:
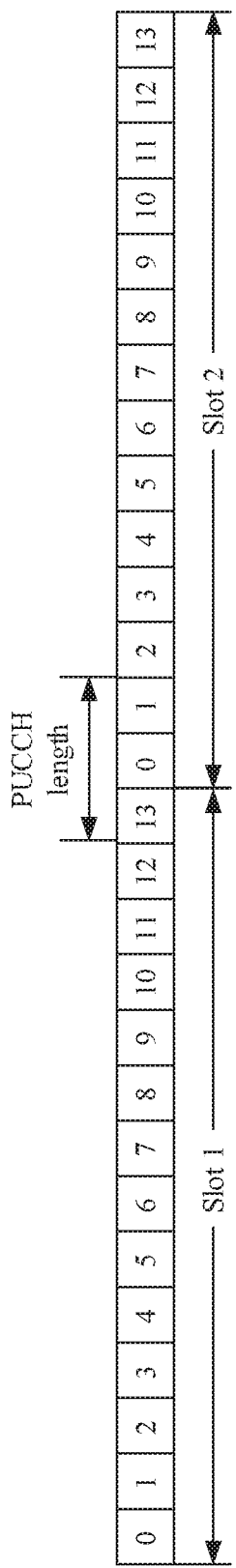
FIG. 7 is a schematic diagram 2 of an uplink control channel resource according to this application.

For example, in FIG. 6, an example in which one PUCCH resource is associated with one slot is used. In practice, a scenario shown in FIG. 7 may alternatively exist. For example, a time-domain length of a PUCCH resource is 3, and one slot includes 14 symbols. When a start symbol of the PUCCH resource is a symbol 13 in a slot 1, the PUCCH resource may span two slots, that is, the slot 1 and a slot 2. To be specific, the PUCCH resource includes the symbol 13 in the slot 1, a symbol 0 in the slot 2, and a symbol 1 in the slot 2.

Optionally, the parameters of the plurality of uplink control channel resources may be sent by the network device to the terminal by using one piece of downlink configuration information (for example, radio resource control (RRC) signaling); or the parameters of the plurality of uplink control channel resources are carried in a plurality of pieces of downlink configuration information, and the network device sends the plurality of pieces of downlink configuration information to the terminal. A manner of sending the parameters of the plurality of uplink control channel resources is not limited in this application.

Optionally, the network device may group the plurality of uplink control channel resources into M resource groups, where M is an integer greater than or equal to 1.

In a possible embodiment of this application, before step S106, the method provided in this application further includes: grouping, by the network device, the plurality of uplink control channel resources into the M resource groups.

A manner of grouping the plurality of uplink control channel resources into the M resource groups by the network device is not limited in this application.

In a possible implementation 1, the network device in this application may group the plurality of uplink control channel resources into the M resource groups in the following manner:

The network device groups, into a same resource group based on a start symbol of each of the plurality of uplink control channel resources, uplink control channel resources whose start symbols are the same. It may be understood that, in this case, uplink control channel resources in different resource groups have different start symbols, and uplink control channel resources in a same resource group have a same start symbol.

For example, uplink control channel resources: a PUCCH resource 1, a PUCCH resource 2, a PUCCH resource 3, a PUCCH resource 4, and a PUCCH resource 5 are used as an example. A start symbol of the PUCCH resource 1 is a symbol 5, a start symbol of the PUCCH resource 2 is a symbol 5, a start symbol of the PUCCH resource 3 is a symbol 6, a start symbol of the PUCCH resource 4 is a symbol 6, and a start symbol of the PUCCH resource 5 is a symbol 6. In this case, the network device may determine that the PUCCH resource 1 and the PUCCH resource 2 belong to a same PUCCH resource group 1, and determine that the PUCCH resource 3, the PUCCH resource 4, and the PUCCH resource 5 belong to a same PUCCH resource group 2.

It should be noted that when uplink control channel resources in a same resource group have a same start symbol, one or more uplink control channel resources in the same resource group may have a same time-domain length, a same frequency-domain position, and a same cyclic offset; or may have different time-domain lengths, different frequency-domain positions, and different cyclic offsets. The time-domain length, frequency-domain position, and the cyclic offset are not limited in this application.

For example, a time-domain length of the PUCCH resource 3 is one symbol, and a time-domain length of the PUCCH resource 4 and a time-domain length of the PUCCH resource 5 are two symbols.

In a possible implementation 2, the network device in this application may group the plurality of uplink control channel resources into the M resource groups in the following manner:

The network device groups, into a same resource group based on a start symbol of each of the plurality of uplink control channel resources, uplink control channel resources whose start symbols are different. It may be understood that, in this case, uplink control channel resources in a same resource group have different start symbols; and uplink control channel resources in a same resource group may have a same time-domain length, a same frequency-domain position, and a same cyclic offset; or may have different time-domain lengths, different frequency-domain positions, and different cyclic offsets. The time-domain length, frequency-domain position, and the cyclic offset are not limited in this application.

For example, with reference to the foregoing example, the network device may determine that a PUCCH resource 1 and a PUCCH resource 3 belong to a same PUCCH resource group 1, determine that a PUCCH resource 2 and a PUCCH resource 4 belong to a same PUCCH resource group 2, determine that a PUCCH resource 5 belongs to a PUCCH resource group 3, and determine that a PUCCH resource 6 belongs to a PUCCH resource group 4.

It may be understood that when start symbols of PUCCH resources in a same PUCCH resource group are different, a maximum quantity of PUCCH resources included in each PUCCH resource group is determined by a type of start symbols of one or more PUCCH resources. For example, in the foregoing example, the PUCCH resource 1 to the PUCCH resource 6 have two types of start symbols, that is, the start symbols are a symbol 5 and a symbol 6. In this case, the PUCCH resource group 1 and the PUCCH resource group 2 have a maximum of two PUCCH resources.

It should be noted that, after the network device groups the plurality of uplink control channel resources into the M resource groups, the parameters of the plurality of uplink control channel resources sent by the network device to the terminal may further include an identifier of a resource group in which any uplink control channel resource is located.

S107. The terminal receives the parameters of the plurality of uplink control channel resources sent by the network device.

It may be understood that, after receiving the parameters of the plurality of uplink control channel resources, the terminal can determine the uplink control channel resource based on any one of the parameters of the plurality of uplink control channel resources.

For example, in the parameters of the plurality of uplink control channel resources, if a start symbol of an uplink control channel resource 1 is a symbol 5, and a time-domain length of the uplink control channel resource 1 is three symbols, the terminal may determine that the uplink control channel resource 1 includes the symbol 5, a symbol 6, and a symbol 7.

Figure 8:
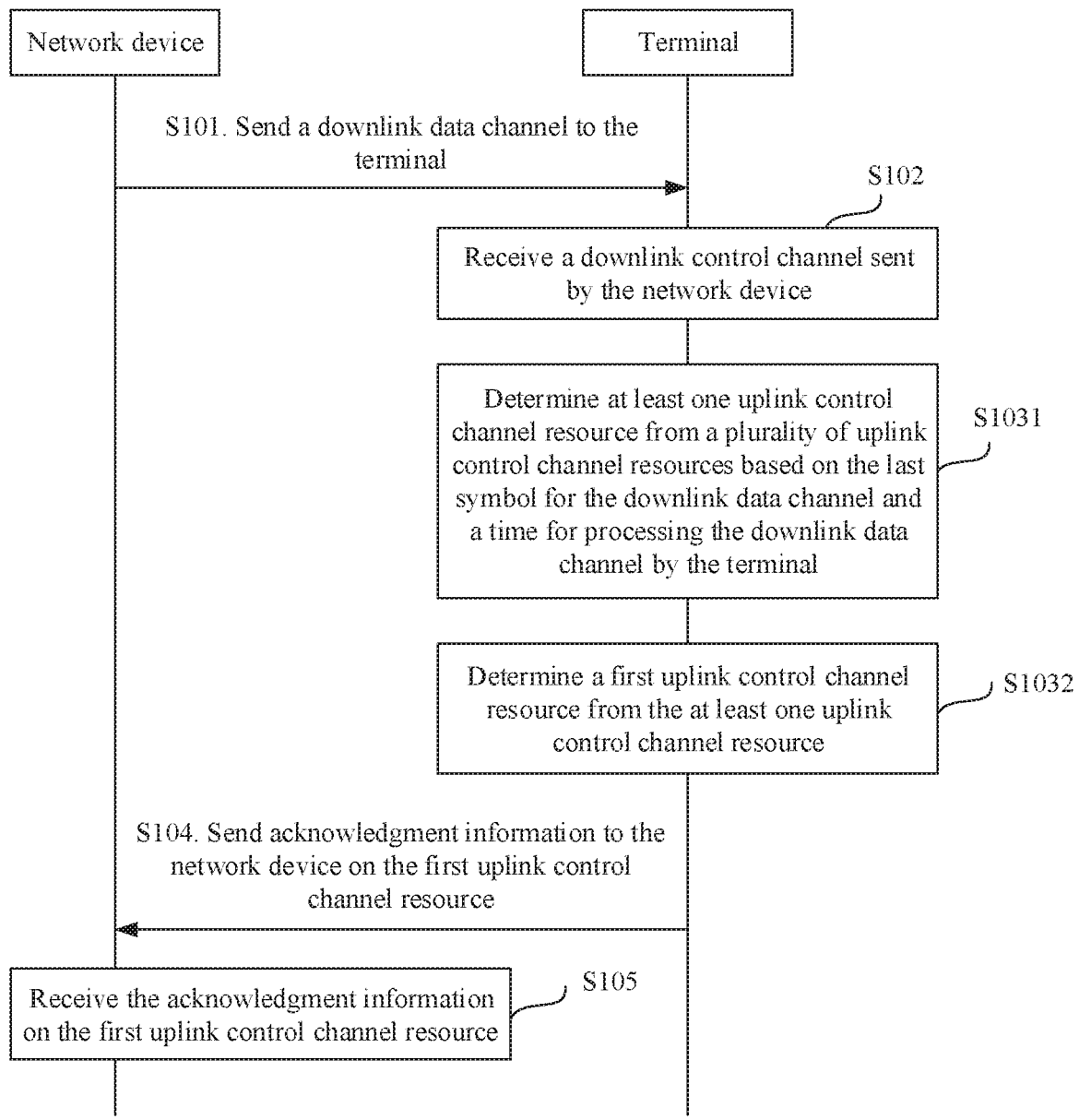
FIG. 8 is a schematic flowchart 3 of a resource indication method and a resource determining method according to this application.

In a possible implementation, as shown in FIG. 8, step S103 in this application may be specifically implemented in the following manner:

S1031. The terminal determines at least one uplink control channel resource (for example, the at least one uplink control channel resource is L uplink control channel resources, where L is a positive integer less than or equal to K) from the plurality of uplink control channel resources based on the index of the last symbol for the downlink data channel and the time for processing the downlink data channel by the terminal.

S1032. The terminal determines the first uplink control channel resource from the at least one uplink control channel resource.

The at least one uplink control channel resource in this application is determined by the terminal from the plurality of uplink control channel resources based on a first symbol (for example, a first time-domain symbol) and the parameters of the plurality of uplink control channel resources. The first symbol is the last symbol for the downlink data channel and the $1^{st}$ symbol (for example, the $1^{st}$ time-domain symbol) following the time for processing the downlink data channel by the terminal.

When the plurality of uplink control channel resources are corresponding to M resource groups, in another possible implementation, as shown in FIG. 8, step S103 in this application may be specifically implemented in the following manner: The terminal may determine, as the at least one uplink control channel resource, an uplink control channel resource included in any one of the M resource groups.

Specifically, the terminal obtains a first message (for example, obtains the first message from the network device). The first message is used to indicate information about a resource group. In this case, the terminal determines, as the at least one uplink control channel resource based on the first message, an uplink control channel resource that is included in the resource group, indicated by the first message, in the M resource groups.

In different scenarios of a mobile communications system, manners of determining the at least one uplink control channel resource by the terminal are different. Therefore, the following separately provides description with reference to different scenarios.

Scenario 1: The method provided in this application is applicable to a frequency division duplexing (FDD) system.

The at least one uplink control channel resource is an available uplink control channel resource in the plurality of uplink control channel resources that follows a first symbol and that is closest to the first symbol, the first symbol is the last symbol for the downlink data channel and the $1^{st}$ symbol following the time for processing the downlink data channel by the terminal, and the available uplink control channel resource is used to send the acknowledgment information.

Figure 9:
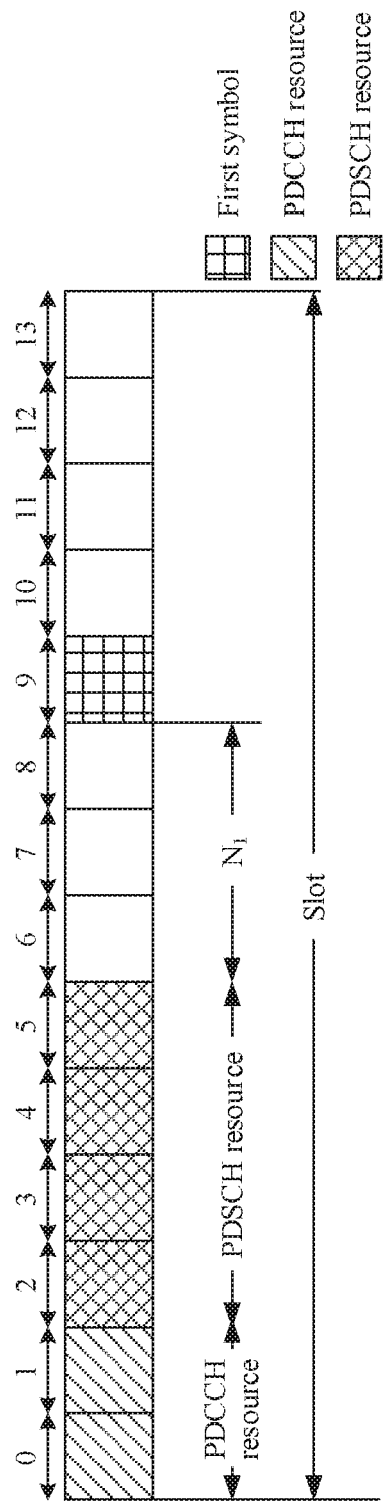
FIG. 9 is a schematic diagram 3 of an uplink control channel resource according to this application.

For example, one slot includes 14 symbols, the last symbol of a PDSCH resource is a symbol 5, and a quantity $N_1$ of symbols occupied by the terminal to demodulate the downlink data channel and generate the acknowledgment information is 3. In this case, as shown in FIG. 9, the first symbol may be a symbol 9 shown in FIG. 9. It may be understood that FIG. 9 shows an example in which the first symbol belongs to a slot in which the PDSCH resource is located. In an actual process, the first symbol may alternatively be located in a slot following a slot in which the PDSCH resource is located, as shown in FIG. 10.

Figure 10:
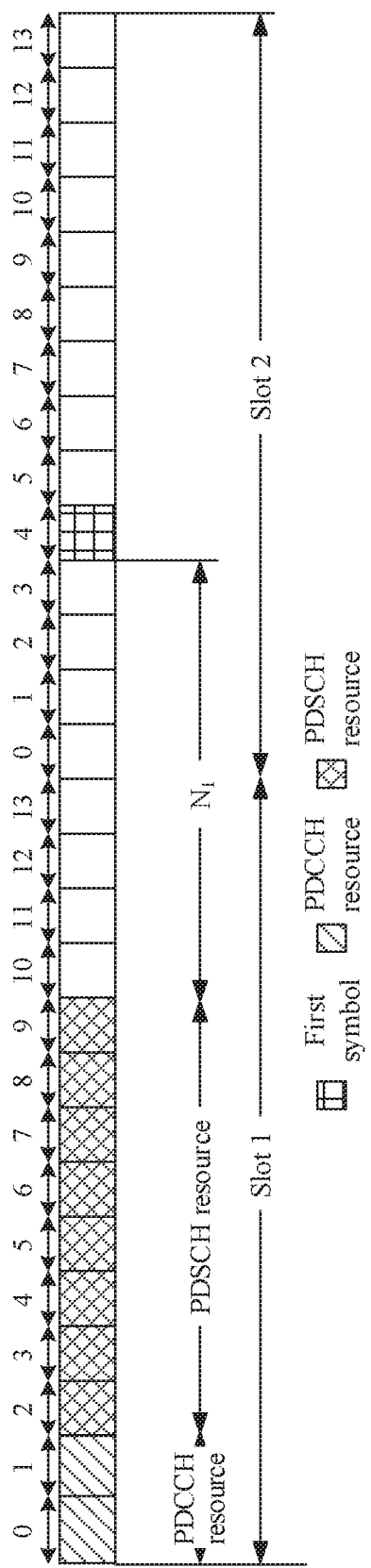
FIG. 10 is a schematic diagram 4 of an uplink control channel resource according to this application.

For example, if the last symbol for the PDSCH resource is the symbol 9 and $N_1$ is 8, the first symbol may be a symbol 4 in a slot 2 shown in FIG. 10.

Figure 11:
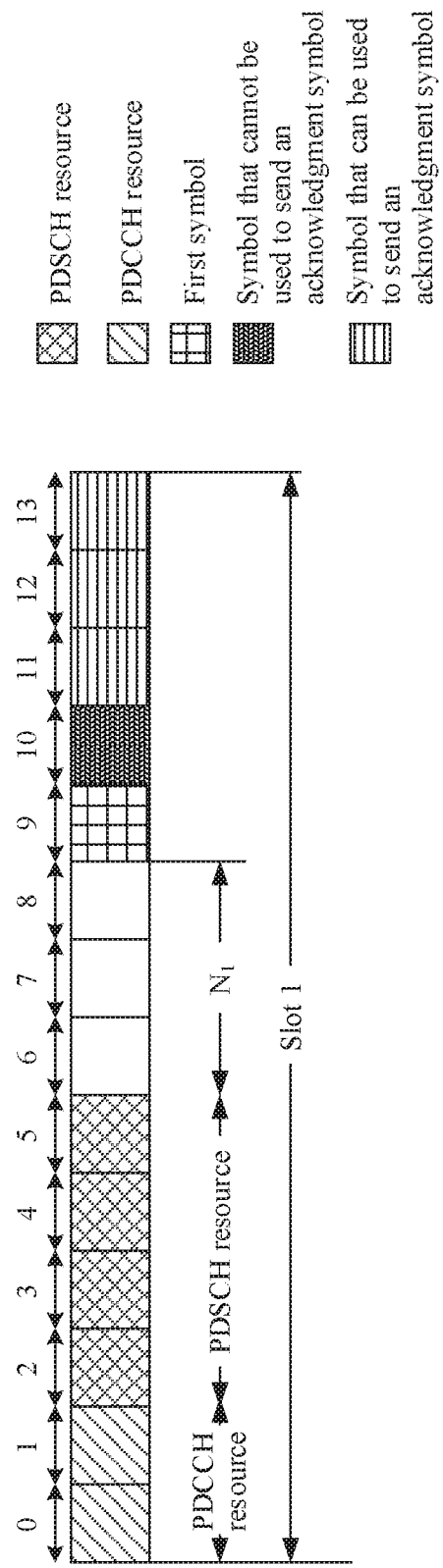
FIG. 11 is a schematic diagram 5 of an uplink control channel resource according to this application.
Figure 12:
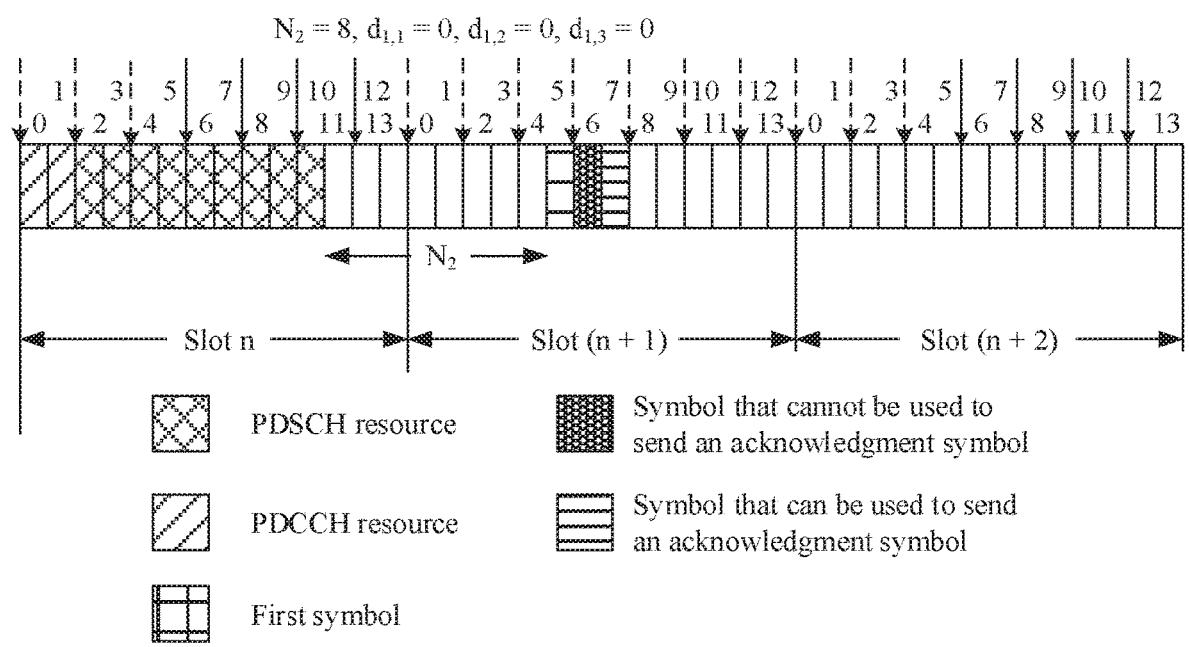
FIG. 12 is a schematic diagram 6 of an uplink control channel resource according to this application.

For example, FIG. 11 and FIG. 12 show examples in which a length of a PDCCH resource is two symbols, a length of a PDSCH resource is nine symbols, and one slot includes 14 symbols.

In an actual process, the first symbol may be located in a slot in which the downlink data channel is located, or may be located outside a slot in which the downlink data channel is located, that is, located in a slot following the slot in which the downlink data channel is located. Therefore, how to determine the at least one uplink control channel resource is described in the following embodiments in different cases.

Case 1: When the first symbol is located in the slot in which the downlink data channel is located, and in the slot in which the downlink data channel is located, there is a symbol that follows the first symbol and that is included in a plurality of uplink control channel resources, the at least one uplink control channel resource is an available uplink control channel resource in the plurality of uplink control channel resources that follows the first symbol and that is closest to the first symbol.

In case 1 in this application, a start symbol of the available uplink control channel resource is the same as a start symbol of any uplink control channel resource, in the plurality of uplink control channel resources, that follows the first symbol: and the available uplink control channel resource belongs to the plurality of uplink control channel resources.

To be specific, when the start symbol of the available uplink control channel resource is the same as the start symbol of the any uplink control channel resource, in the plurality of uplink control channel resources, that follows the first symbol, the available uplink control channel resource further needs to meet one or more of the following conditions: A time-domain length is the same as a time-domain length of the any one of the plurality of uplink control channel resources, a frequency-domain position is the same as a frequency-domain position of the any one of the plurality of uplink control channel resources, and a cyclic offset is the same as a cyclic offset of the any one of the plurality of uplink control channel resources.

It should be noted that the following embodiment describes an example in which the start symbol of the available uplink control channel resource is the same as the start symbol of the any uplink control channel resource, in the plurality of uplink control channel resources, that follows the first symbol and the time-domain length is the same as the time-domain length of the any uplink control channel resource, but does not constitute a limitation to the solutions of this application.

For example, as shown in FIG. 11, if one slot includes 14 symbols, a start symbol of a PDCCH resource is a symbol 0 in a slot 1, a time-domain length of the PDCCH resource is two symbols, the last symbol of a PDSCH resource is a symbol 5, and $N_1$ is 3, the first symbol is a symbol 9 in the slot 1. A symbol 11, a symbol 12, and a symbol 13 in the slot 1 in FIG. 11 are symbols that belong to a plurality of PUCCH resources, or are symbols that are configured by the network device and that can be used to send the acknowledgment information. In this case, if the plurality of PUCCH resources configured by the terminal include a PUCCH resource 1, a PUCCH resource 2, and a PUCCH resource 3, where a start symbol of the PUCCH resource 1 is the symbol 11 in the slot 1, a time-domain length of the PUCCH resource 1 is one symbol, a start symbol of the PUCCH resource 2 is the symbol 12 in slot 1, a time-domain length of the PUCCH resource 2 is one symbol, a start symbol of the PUCCH resource 3 is the symbol 13 in slot 1, and a time-domain length of the PUCCH resource 3 is one symbol, the terminal can determine that the at least one PUCCH resource includes the PUCCH resource 1, the PUCCH resource 2, and the PUCCH resource 3.

If the plurality of PUCCH resources configured by the terminal include a PUCCH resource 4 and a PUCCH resource 5, where a start symbol of the PUCCH resource 4 is the symbol 11 in the slot 1, a time-domain length of the PUCCH resource 4 is two symbols, a start symbol of the PUCCH resource 5 is the symbol 12 in the slot 1, and a time-domain length of the PUCCH resource 5 is two symbols, the terminal can determine that the at least one PUCCH resource includes the PUCCH resource 4 and the PUCCH resource 5. The PUCCH resource 4 includes the symbol 11 and the symbol 12, and the PUCCH resource 5 includes the symbol 12 and the symbol 13.

If the plurality of PUCCH resources configured by the terminal include a PUCCH resource 6, where a start symbol of the PUCCH resource 6 is the symbol 11 in the slot 1, and a time-domain length of the PUCCH resource 6 is three symbols, the terminal can determine that the at least one PUCCH resource includes the PUCCH resource 6. The PUCCH resource 6 includes the symbol 11, the symbol 12 and the symbol 13.

It should be noted that the available uplink control channel resource closest to the first symbol in this application may be one or more available uplink control channel resources because different uplink control channel resources may have a same start symbol and different time-domain lengths.

Still with reference to FIG. 11, the plurality of PUCCH resources configured by the network device include the PUCCH resource 1, the PUCCH resource 4, the PUCCH resource 5, and the PUCCH resource 6. Because the start symbols of the PUCCH resource 1, the PUCCH resource 4, and the PUCCH resource 6 are all the symbol 11, and as shown in FIG. 11, an uplink control channel resource including the symbol 11 is closest to the first symbol, available uplink control channel resources include the PUCCH resource 1, the PUCCH resource 4, and the PUCCH resource 6.

Case 2: When the first symbol is located outside the slot in which the downlink data channel is located, or in the slot in which the downlink data channel is located, there is no symbol that follows the first symbol and that is included in a plurality of uplink control channel resources, the at least one uplink control channel resource is an available uplink control channel resource in the plurality of uplink control channel resources that is closest to the first symbol and that is located in a slot following the slot in which the downlink data channel is located.

For example, as shown in FIG. 12, FIG. 12 shows an example in which $N_2=8$, and the last symbol of the PDSCH resource is a symbol 10. The first symbol is a symbol 5 in a slot (n+1), and a symbol 7 in the slot (n+1) is a symbol of a PUCCH resource that is configured by the network device for the terminal and that can be used to send the acknowledgment information. Therefore, the terminal can determine, as the at least one PUCCH resource, a PUCCH resource in the plurality of PUCCH resources whose start symbol is the same as the symbol 7 in the slot (n+1) and whose time-domain length is the same as a length of any one of the plurality of PUCCH resources following the symbol 5. FIG. 12 shows an example in which a length of an available PUCCH resource indicated by the network device is one symbol.

It should be noted that, after the symbol 7 in the slot (n+1) or in a slot following the slot (n+1), if there is still a symbol that belongs to one or more PUCCH resources, all symbols that follow the symbol 7 in the slot (n+1) or are in the slot following the slot (n+1) and that belong to one or more PUCCH resources and may be used as the at least one PUCCH resource.

Scenario 2: The method provided in this application is applicable to a time division duplexing (TDD) system. In this case, the terminal may send acknowledgment information on a flexible symbol or an uplink symbol included in a plurality of uplink control channel resources. In other words, all symbols included in each of the plurality of uplink control channel resources need to be uplink symbols or flexible symbols, or all included symbols include both uplink symbols and downlink symbols.

Case 3: When the first symbol is located in the slot in which the downlink data channel is located, and in the slot in which the downlink data channel is located, there is a symbol that follows the first symbol and that is included in a plurality of uplink control channel resources, the at least one uplink control channel resource is an available uplink control channel resource in the plurality of uplink control channel resources that follows the first symbol and that is close to the first symbol. The available uplink control channel resource belongs to the plurality of uplink control channel resources, and a start symbol of the available uplink control channel resource is the same as a start symbol of any uplink control channel resource, in the plurality of uplink control channel resources, that follows the first symbol. All symbols included in the available uplink control channel resource are uplink symbols or flexible symbols.

Optionally, to enable the terminal to correctly send acknowledgment information on an uplink control channel resource, all symbols included in the available uplink control channel resource in this application are uplink symbols.

Figure 13:
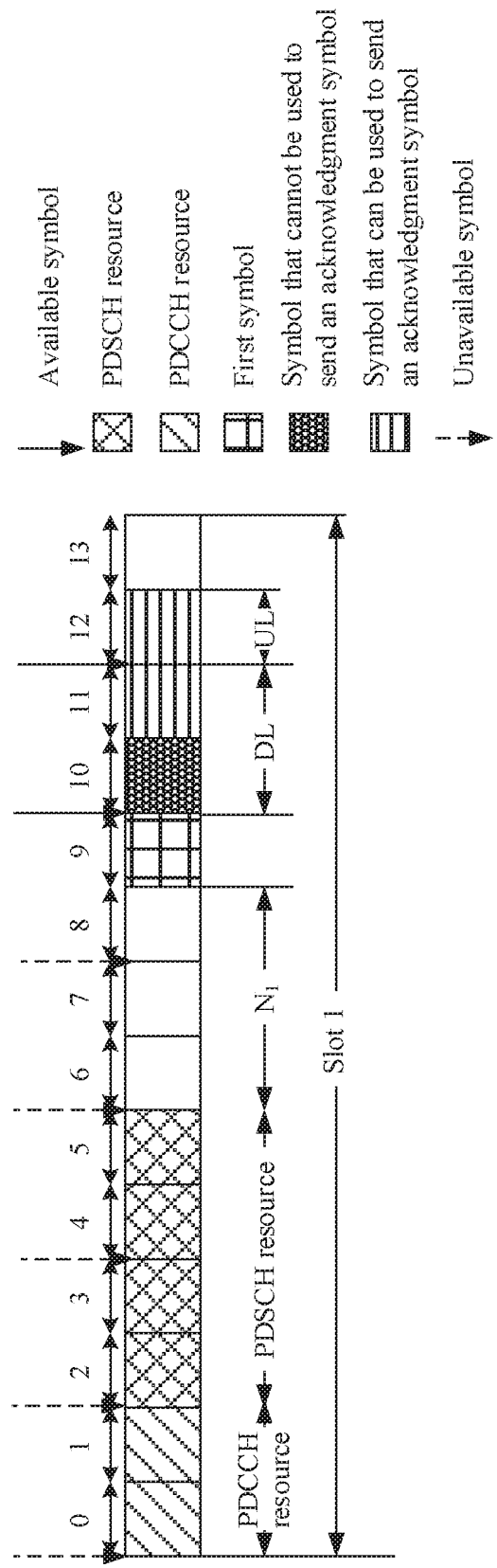
FIG. 13 is a schematic diagram 7 of an uplink control channel resource according to this application.

For example, as shown in FIG. 13, if an uplink control channel resource is a PUCCH resource, one slot includes 14 symbols, a time-domain length of a PDCCH resource is two symbols, the last symbol of the PDSCH resource is a symbol 5, and $N_1=3$, the first symbol is a symbol 9 in a slot 1. A symbol 10 to a symbol 13 follow the symbol 9 in the slot 1, and a plurality of PUCCH resources configured by the network device for the terminal include a PUCCH resource A, a PUCCH resource B, and a PUCCH resource C. A start symbol of the PUCCH resource A is the symbol 10, a time-domain length of the PUCCH resource A is one symbol, a start symbol of the PUCCH resource B is the symbol 11, a time-domain length of the PUCCH resource B is two symbols, a start symbol of the PUCCH resource C is the symbol 12, and a time-domain length of the PUCCH resource C is one symbol. Therefore, the terminal can determine that the symbol 11 to the symbol 12 are symbols belonging to the plurality of PUCCH resources. However, because the symbol 10 and the symbol 11 are downlink symbols, and the symbol 12 is used to send an uplink signal (or is an uplink symbol), the terminal can determine that the at least one PUCCH resource is the PUCCH resource C.

Case 4: When the first symbol is located outside the slot in which the downlink data channel is located, or in the slot in which the downlink data channel is located, there is no symbol that follows the first symbol and that is included the plurality of uplink control channel resources, the at least one uplink control channel resource is an available uplink control channel resource in the plurality of uplink control channel resources that is associated with a slot following a slot that is associated with the downlink data channel.

Figure 14:
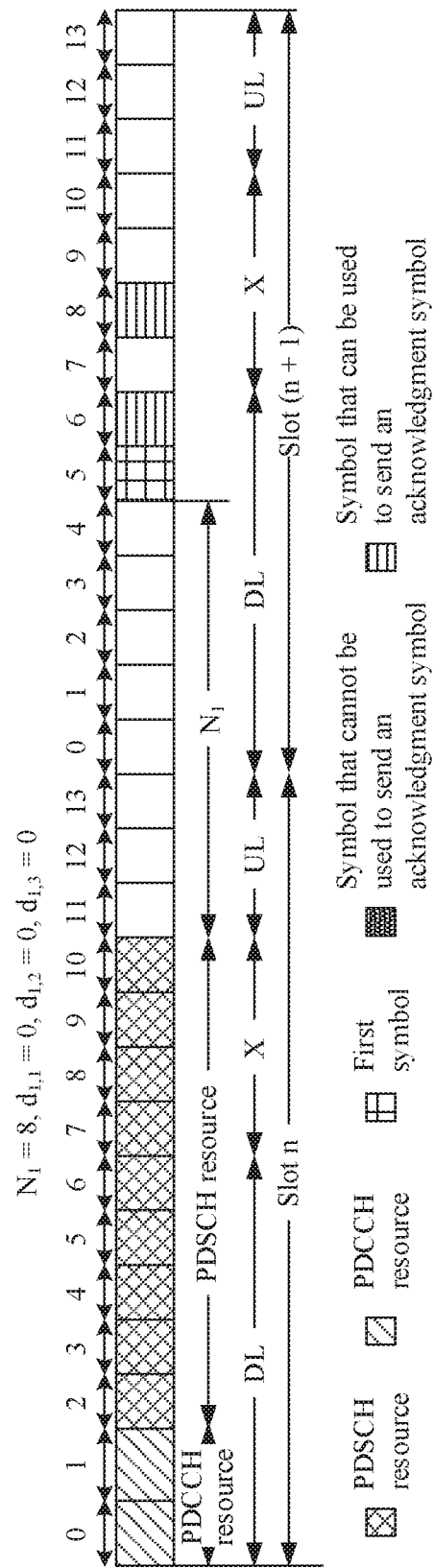
FIG. 14 is a schematic diagram 8 of an uplink control channel resource according to this application.

For example, as shown in FIG. 14, if one slot includes 14 symbols, an uplink-downlink configuration period is one slot, a time-domain length of a PDCCH resource is two symbols. $N_1=8$, a start symbol of the PDCCH resource is a symbol 0 in a slot n, a time-domain length of the PDCCH resource is two symbols, and a time-domain length of a PDSCH resource is nine symbols, the first symbol is a symbol 5 in a slot (n+1). If a plurality of PUCCH resources configured by the network device include a plurality of PUCCH resources whose start symbols are a symbol 8 in the slot (n+1) and that have different time-domain lengths, because a symbol 6 and a symbol 8 in the symbol 6 to a symbol 13 that follow the symbol 5 in the slot (n+1) are symbols belonging to the plurality of PUCCH resources, the symbol 6 is a downlink symbol, and the symbol 8 is a flexible symbol, the terminal may determine that the at least one PUCCH resource is a PUCCH resource whose start symbol is the symbol 8 in the slot (n+1) and whose time-domain length is the same as a time-domain length indicated by the network device. For example, FIG. 14 shows an example in which a time-domain length of a PUCCH is one symbol. In this case, when the at least one PUCCH resource in FIG. 14 is the symbol 8 in the slot (n+1), X in FIG. 14 represents a flexible symbol.

It should be noted that, before step S105 in this application, the method further includes: sending, by the network device, first configuration information to the terminal, where the first configuration information is used by the terminal to determine a function or a purpose of each of one or more symbols included in each of the one or more slots; and determining, by the terminal based on the first configuration information, the function of each symbol included in each slot.

Specifically, the symbol may be an uplink symbol, a downlink symbol, and a flexible symbol. The uplink symbol and the flexible symbol may be used to carry uplink information, the downlink symbol may be used to carry downlink information, and the flexible symbol may carry both uplink information and downlink information.

Figure 15:
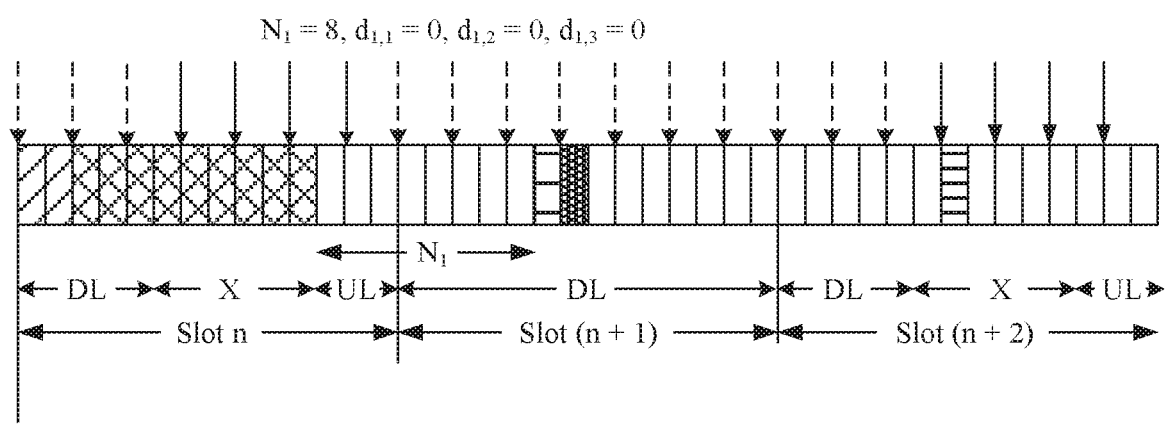
FIG. 15 is a schematic diagram 9 of an uplink control channel resource according to this application.

For example, as shown in FIG. 15, a difference between FIG. 15 and FIG. 14 lies in that FIG. 15 shows an example in which the uplink-downlink configuration period is two slots while FIG. 14 shows an example in which the uplink-downlink configuration period is one slot. In this case, the at least one PUCCH resource may be a PUCCH resource whose start symbol is a symbol 6 in a slot (n+1) shown in FIG. 14 and whose time-domain length is the same as a time-domain length that is indicated by the network device and that is of a PUCCH resource whose start symbol is the symbol 6 in the plurality of PUCCH resources.

Figure 16:
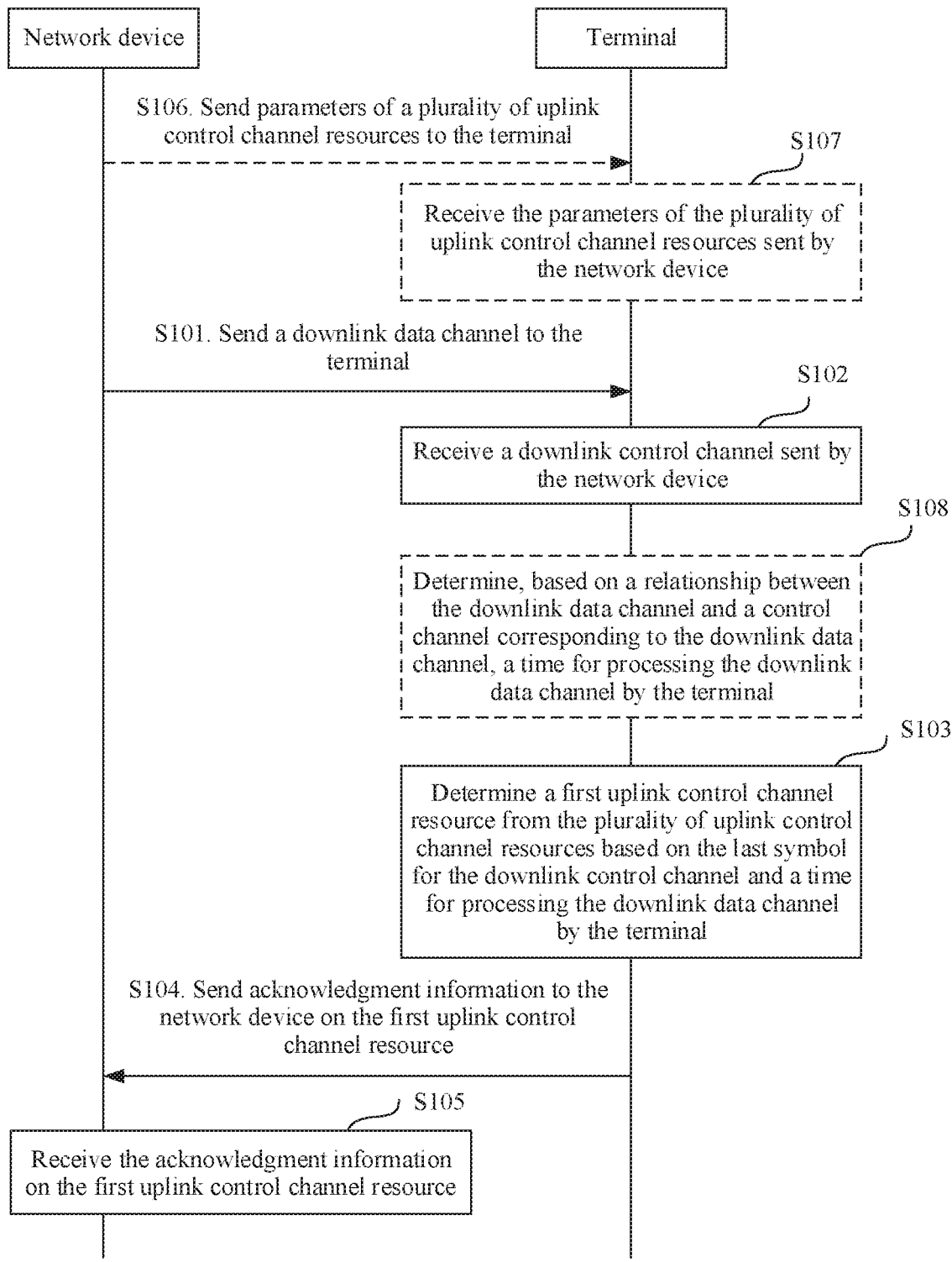
FIG. 16 is a schematic flowchart 4 of a resource indication method and a resource determining method according to this application.

Scenario 3: The terminal may adjust the time for processing the downlink data channel by the terminal. In this case, as shown in FIG. 16, the method provided in this application further includes the following steps.

S108. The terminal determines, based on a relationship between the downlink data channel and a control channel corresponding to the downlink data channel, the time for processing the downlink data channel by the terminal.

Specifically, the time for processing the downlink data channel by the terminal in this application includes at least a quantity of symbols occupied by the terminal to demodulate the downlink data channel and generate the acknowledgment information.

Specifically, step S108 in this application may be implemented in the following manner:

In an implementation, when an interval between the last symbol for the control channel corresponding to the downlink data channel and the start symbol for the downlink data channel is less than a first threshold configured by the network device or predefined in a protocol, the time for processing the downlink data channel by the terminal further includes a quantity of symbols occupied by the terminal to blindly detect and process downlink control information DCI for scheduling the downlink data channel. In this way, a sum of the quantity of symbols occupied by the terminal to blindly detect and process the downlink control information DCI for scheduling the downlink data channel, and the quantity of symbols occupied by the terminal to demodulate the downlink data channel and generate the acknowledgment information may be used as the time for processing the downlink data channel by the terminal.

Figure 17:
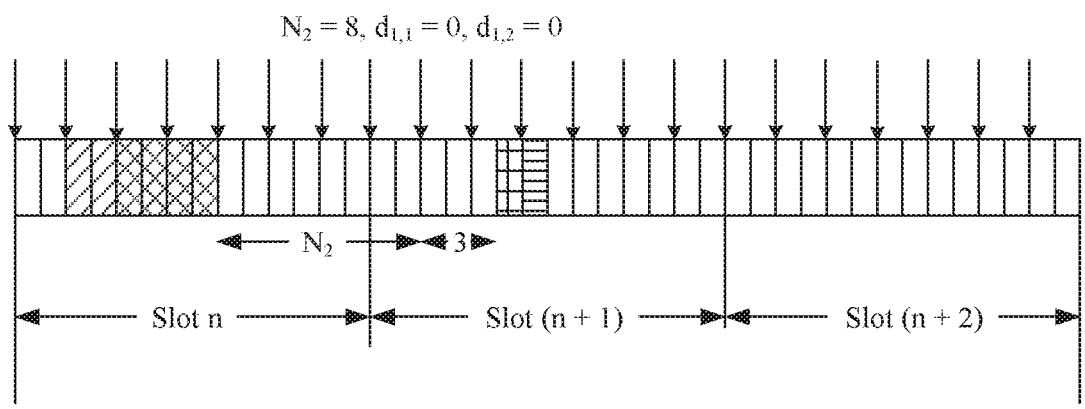
FIG. 17 is a schematic diagram 10 of an uplink control channel resource according to this application.

For example, as shown in FIG. 17, FIG. 17 shows an example in which an interval between the last symbol of a PDCCH resource and a start symbol of a PDSCH resource is less than the first threshold. For example, the last symbol of the PDCCH resource is a symbol 3 in a slot n, and the start symbol of the PDSCH resource is a symbol 4 in the slot n. In this case, the terminal determines that the time for processing the downlink data channel by the terminal includes a quantity $N_2=8$ of symbols occupied by the terminal to demodulate the downlink data channel and generate acknowledgment information, and a quantity $N_3=3$ of symbols occupied by the terminal to blindly detect and parse the downlink control information DCI for scheduling the downlink data channel, that is, $N_1=N_2+N_3=8+3=11$, where $N_1$ represents the time for processing the downlink data channel by the terminal.

In another implementation, when the interval between the last symbol for the control channel corresponding to the downlink data channel and the start symbol for the downlink data channel is greater than or equal to the first threshold configured by the network device or predefined in the protocol, the time for processing the downlink data channel by the terminal is the quantity of symbols occupied by the terminal to demodulate the downlink data channel and generate the acknowledgment information.

Figure 18:
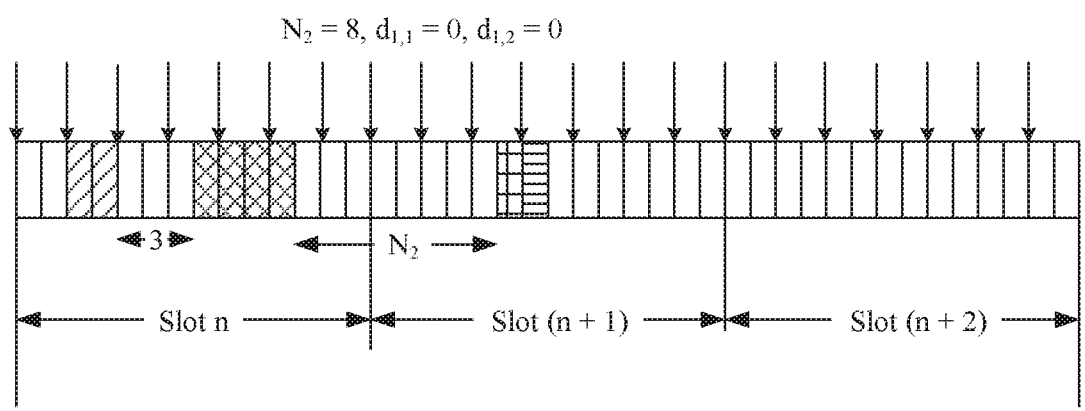
FIG. 18 is a schematic diagram 11 of an uplink control channel resource according to this application.

For example, FIG. 18 shows an example in which the first threshold is three symbols. It is assumed that an interval between the last symbol of a PDCCH resource and a start symbol of a PDSCH resource is greater than or equal to three symbols. The last symbol of the PDCCH resource is a symbol 3 in a slot n, a start symbol of the PDSCH resource is a symbol 7 in the slot n, and the quantity of symbols occupied by the terminal to blindly detect and parse the DCI is 3. Because the interval between the last symbol of the control channel and the start symbol for the downlink data channel is equal to the first threshold configured by the network device or predefined in the protocol, the terminal determines that $N_1=N_2=8$.

It may be understood that, when scenario 3 is described, an FDD system is used as an example in FIG. 17 and FIG. 18. In an actual process, when scenario 3 is applied to a TDD system, an uplink-downlink configuration further needs to be considered. For a specific process, refer to the description in scenario 2. Details are not described herein again in this application.

Before the scenario 4 and the scenario 5 in this application are described, two PDSCH resource mapping modes are first described. The following uses a PDSCH resource mapping mode A and a PDSCH resource mapping mode B as an example. The PDSCH resource mapping mode A means that a start symbol of a PDSCH resource may be any one of a symbol 0, a symbol 1, a symbol 2, and a symbol 3 in a slot, and a time-domain length of the PDSCH resource is at least three symbols and a maximum of 14 symbols and does not cross over a slot boundary. The PDSCH resource mapping mode B means that a PDSCH resource may start on any symbol in a slot, but a time-domain length of the PDSCH resource can only be any one of two symbols, four symbols, six symbols, or seven symbols and is allowed to cross over the slot boundary.

Scenario 4: In the PDSCH resource mapping mode A, a quantity of symbols occupied by the terminal to demodulate the downlink data channel and generate acknowledgment information is adjusted (as shown in FIG. 12, for simplicity, an FDD system is used as an example. Certainly, the solution shown in FIG. 12 is further applicable to a TDD system, and an uplink-downlink configuration further needs to be considered in the TDD system. For a specific method for determining at least one PUCCH resource based on the uplink-downlink configuration in the TDD system, refer to the description of the scenario 2 in the foregoing embodiment. Details are not described herein again in this application.)

In the PDSCH resource mapping mode A, it is assumed that an end symbol of a PDSCH resource is the $i^{th}$ symbol in a slot. When $i<7$, $d_{1,3}=7-i$. When $i \geq 7$, $d_{1,3}=0$, where $d_{1,3}$ represents an adjustment amount by which the quantity of symbols occupied by the terminal to demodulate the downlink data channel and generate the acknowledgment information is adjusted.

For example, as shown in FIG. 12, FIG. 12 shows an example in which the quantity $N_2$ of symbols meets $N_2=8$, $d_{1,1}=0$, $d_{1,2}=0$, $d_{1,3}=0$, a start symbol of a PDCCH resource is a symbol 0 in a slot n, a time-domain length of the PDCCH resource is two symbols, and a time-domain length of a PDSCH resource is nine symbols. In this case, an end symbol of the PDSCH resource is $i=11$. Because $i>7$, and $d_{1,3}=0$, the terminal does not need to adjust the quantity of symbols occupied by the terminal to demodulate the downlink data channel and generate the acknowledgment information, that is, the terminal determines that $N_1=N_2=8$.

A value of $d_{1,1}$ is determined based on whether a HARQ-ACK message is carried on a PUCCH or a PUSCH (Physical Uplink Shared Channel). In this application, a value of $d_{1,1}$ is 0. The value of $d_{1,2}$ is determined based on whether the HARQ-ACK message is corresponding to a single carrier or a plurality of carriers. In a case of a single carrier, the value of $d_{1,2}$ is 0. Currently, in this application, the single carrier is used as an example. In a case of a plurality of carriers, the value of $d_{1,2}$ may be a non-zero value as specified in a protocol.

Figure 19:
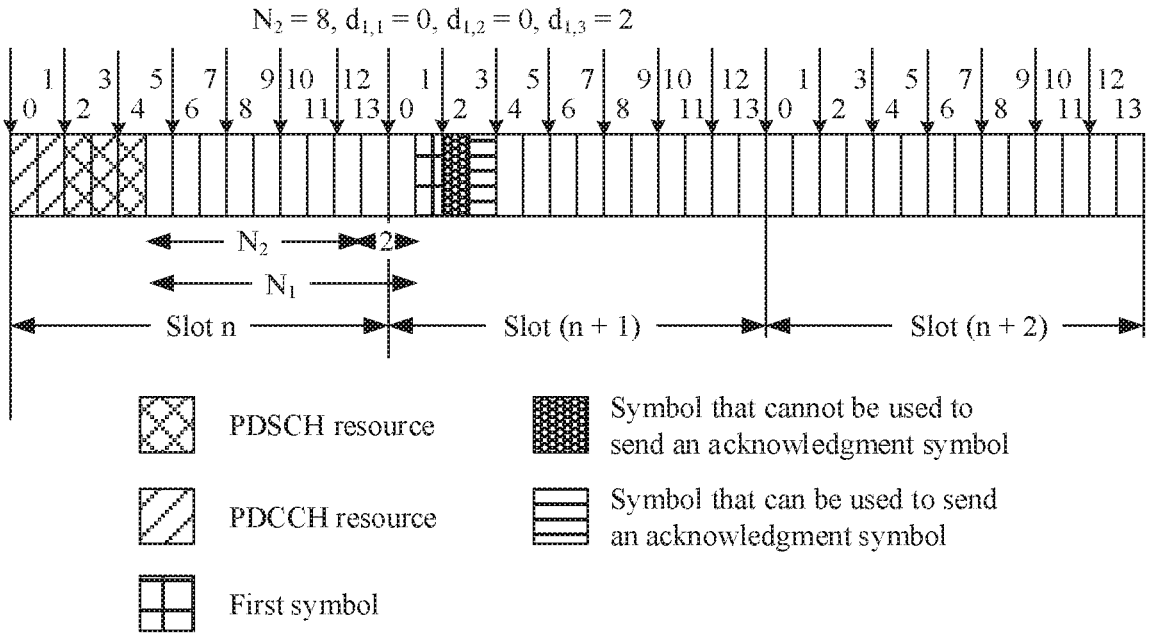
FIG. 19 is a schematic diagram 12 of an uplink control channel resource according to this application.

As shown in FIG. 19, $N_2=8$, a start symbol of a PDCCH resource is a symbol 0 in a slot n, a time-domain length of the PDCCH resource is two symbols, and a time-domain length of a PDSCH resource is three symbols. In this case, an end symbol i of the PDSCH meets $i=5$. Because $i<7$, $d_{1,3}=7-i=7-5=2$. In this case, the terminal needs to adjust the quantity of symbols occupied by the terminal to demodulate the downlink data channel and generate the acknowledgment information.

When the quantity of symbols occupied by the terminal to demodulate the downlink data channel and generate the acknowledgment information is not adjusted (that is $d_{1,1}=0$, $d_{1,2}=0$, $d_{1,3}=0$,), the first symbol determined by the terminal is a symbol 12 in a slot n, but $d_{1,3}=7-i=7-5=2$. In this case, $N_1=N_2+d_{1,3}=8+2=10$. When the quantity of symbols occupied by the terminal to demodulate the downlink data channel and generate the acknowledgment information is adjusted, an adjusted first symbol is a symbol 0 in a slot (n+1). As shown in FIG. 19, if a plurality of PUCCH resources configured by the network device include a PUCCH resource D, a start symbol of the PUCCH resource D is a symbol 3 in the slot (n+1), and a time-domain length of the PUCCH resource D is one symbol, the terminal can determine that the at least one PUCCH resource is the PUCCH resource D including the symbol 3 in the slot (n+1).

Scenario 5: In the PDSCH resource mapping mode B, a quantity of symbols occupied by the terminal to demodulate the downlink data channel and generate acknowledgment information is adjusted (for simplicity, an FDD system is used as an example in FIG. 20. Certainly, the scenario 5 is also applicable to a TDD system. When the method is applicable to a TDD system, an uplink-downlink configuration needs to be considered. For a specific implementation process, refer to the description in scenario 2. Details are not described herein again in this application).

In the PDSCH resource mapping mode B, when a time-domain length of a PDSCH resource is seven symbols, $d_{1,3}=0$; when the time-domain length of the PDSCH resource is four symbols, $d_{1,3}=3$; and when the time-domain length of the PDSCH resource is two symbols, a value of $d_{1,3}$ is unknown. For example, when the time-domain length of the PDSCH resource is two symbols, $d_{1,3}>3$. For example, the value of $d_{1,3}$ is 5.

Figure 20:
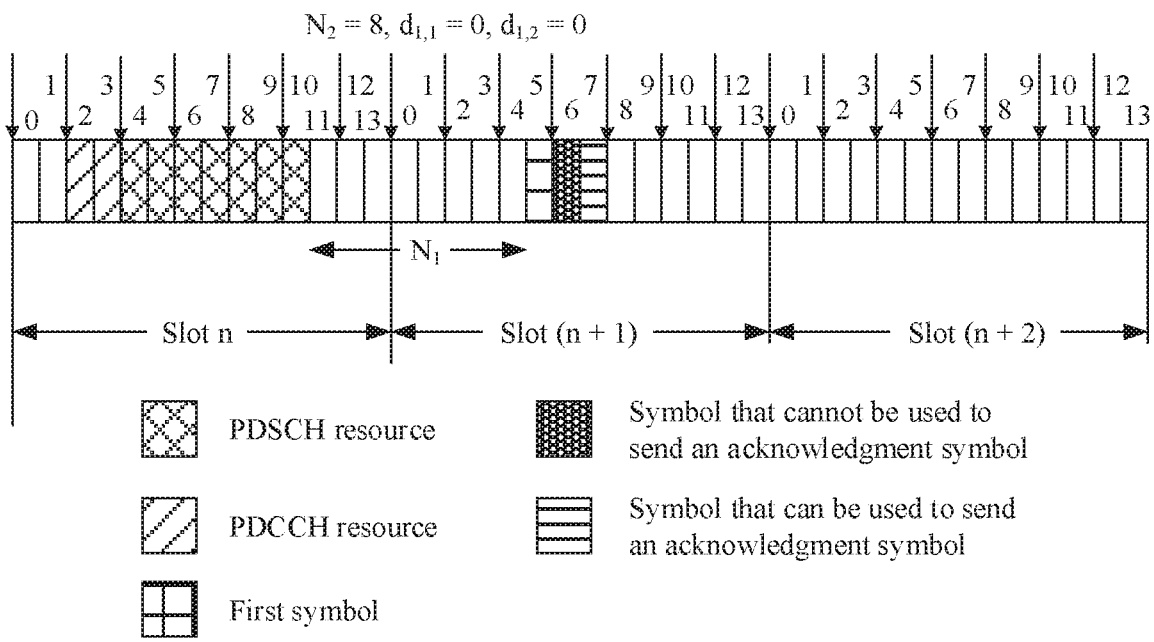
FIG. 20 is a schematic diagram 13 of an uplink control channel resource according to this application.

As shown in FIG. 20, FIG. 20 shows an example in which $N_2=8$, a time-domain length of a PDCCH resource is two symbols, and a time-domain length of a PDSCH resource is seven symbols. It can be learned from the foregoing content that $d_{1,3}=0$. In this case, when $N_2$ does not need to be adjusted, it may be learned from FIG. 20 that the terminal determines that the first symbol is a symbol 4 in a slot (n+1). When $N_2$ does not need to be adjusted, as shown in FIG. 20, for a manner of determining, by the terminal, the at least one PUCCH resource following the symbol 4 in the slot (n+1), refer to the description in the foregoing embodiment. Details are not described herein again in this application.

Figure 21:
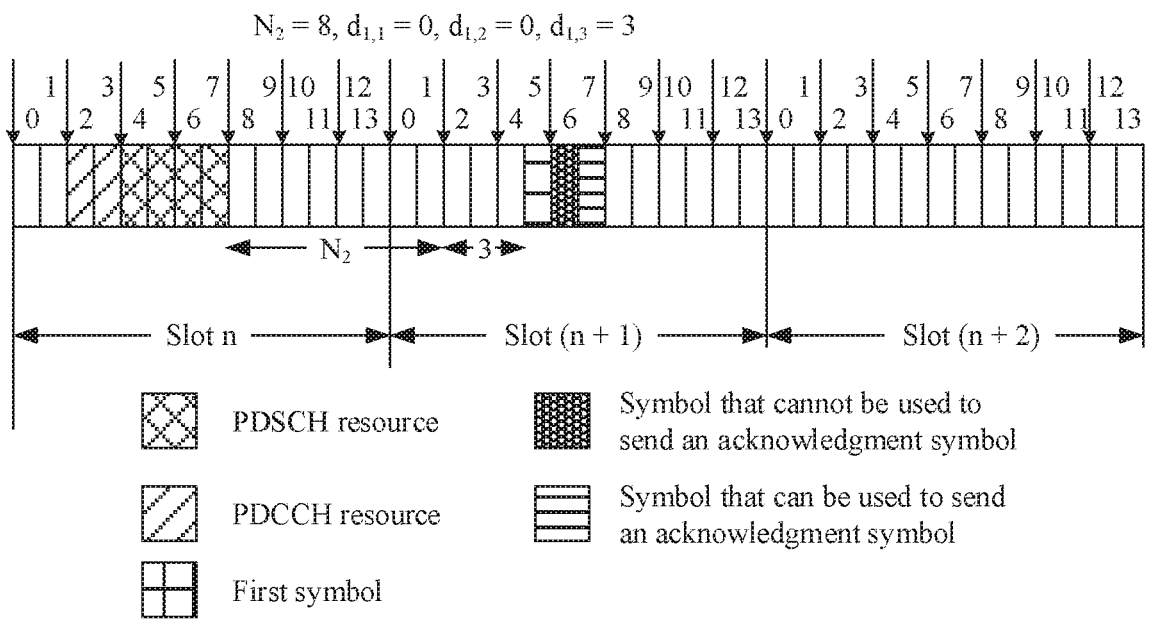
FIG. 21 is a schematic diagram 14 of an uplink control channel resource according to this application.

As shown in FIG. 21, FIG. 21 shows an example in which $N_2=8$, a start symbol of a PDCCH resource is a symbol 2 in a slot n, a time-domain length of the PDCCH resource is two symbols, and a time-domain length of a PDSCH resource is four symbols. It can be learned from the foregoing content that, $d_{1,3}=3$. In this case, $N_2$ needs to be adjusted to obtain $N_1$, and $N_1=N_2+d_{1,3}=8+3=11$. Therefore, when $d_{1,1}=0$, $d_2=0$, $d_{1,3}=3$, the terminal can determine that the first symbol is a symbol 4 in a slot (n+1). As shown in FIG. 21, for a manner of determining, by the terminal, the at least one PUCCH resource following the symbol 4 in the slot (n+1), refer to the description in the foregoing embodiment. Details are not described herein again in this application.

In this application, the plurality of uplink control channel resources are associated with one or more slots, and the one or more slots are slots that are configured by the network device for the terminal and that can be used to send acknowledgment information. In another possible embodiment of this application, the method provided in this application further includes: determining, by the terminal as a first slot from one or more slots, a slot in which the at least one uplink control channel resource is located. The first slot is a slot used to send acknowledgement information.

For example, as shown in FIG. 21, the terminal determines that the at least one uplink control channel resource is a symbol that belongs to a plurality of uplink control channel resources in a slot (n+1). Therefore, the terminal determines that the at least one uplink control channel resource is associated with a first slot. The first slot in this application is a slot used to send acknowledgment information.

Specifically, for a process in which the terminal determines the first slot, refer to the process in which the terminal determines the at least one uplink control channel resource based on step S1031 in the foregoing embodiment. Details are not described herein again in this application.

According to an aspect, if the terminal determines that a slot associated with the downlink data channel includes a flexible symbol or one or more uplink symbols following the first symbol, and the flexible symbol or the one or more uplink symbols are included in a plurality of uplink control channel resources, the terminal determines that the first slot is the slot associated with the downlink data channel. For example, as shown in FIG. 13, because the first symbol is the symbol 9 in the slot 1, and the symbol 12 in the slot 1 is an uplink symbol, the terminal can determine that the first slot is the slot 1.

According to another aspect, if the terminal determines that a slot associated with the downlink data channel does not include a flexible symbol or one or more uplink symbols following the first symbol, or the first symbol is in a slot that follows a slot associated with the downlink data channel and that includes an uplink symbol or a flexible symbol, the terminal determines that the first slot is the slot following the slot associated with the downlink data channel.

For example, as shown in FIG. 14, the terminal determines that the first symbol is a symbol 5 in a slot (n+1), a symbol 8 in the slot (n+1) is a flexible symbol, and the plurality of PUCCH resources include a PUCCH resource whose start symbol is 8 in the slot (n+1). In this case, the terminal determines that the first slot is the slot (n+1).

In another possible embodiment of this application, the first slot may be further determined in the following manner in this application: The terminal determines the first slot as indicated by the network device or as predefined in a protocol.

For example, the terminal determines the first slot as indicated by the network device. The network device may indicate, in DCI sent to the terminal, a specific slot used to feed back acknowledgment information. For example, the DCI may carry 3-bit indication information used to indicate the slot used to feed back the acknowledgment information. For example, the DCI may carry 111, and the terminal may determine to feed back the acknowledgment information by using the slot 8.

Figure 23:
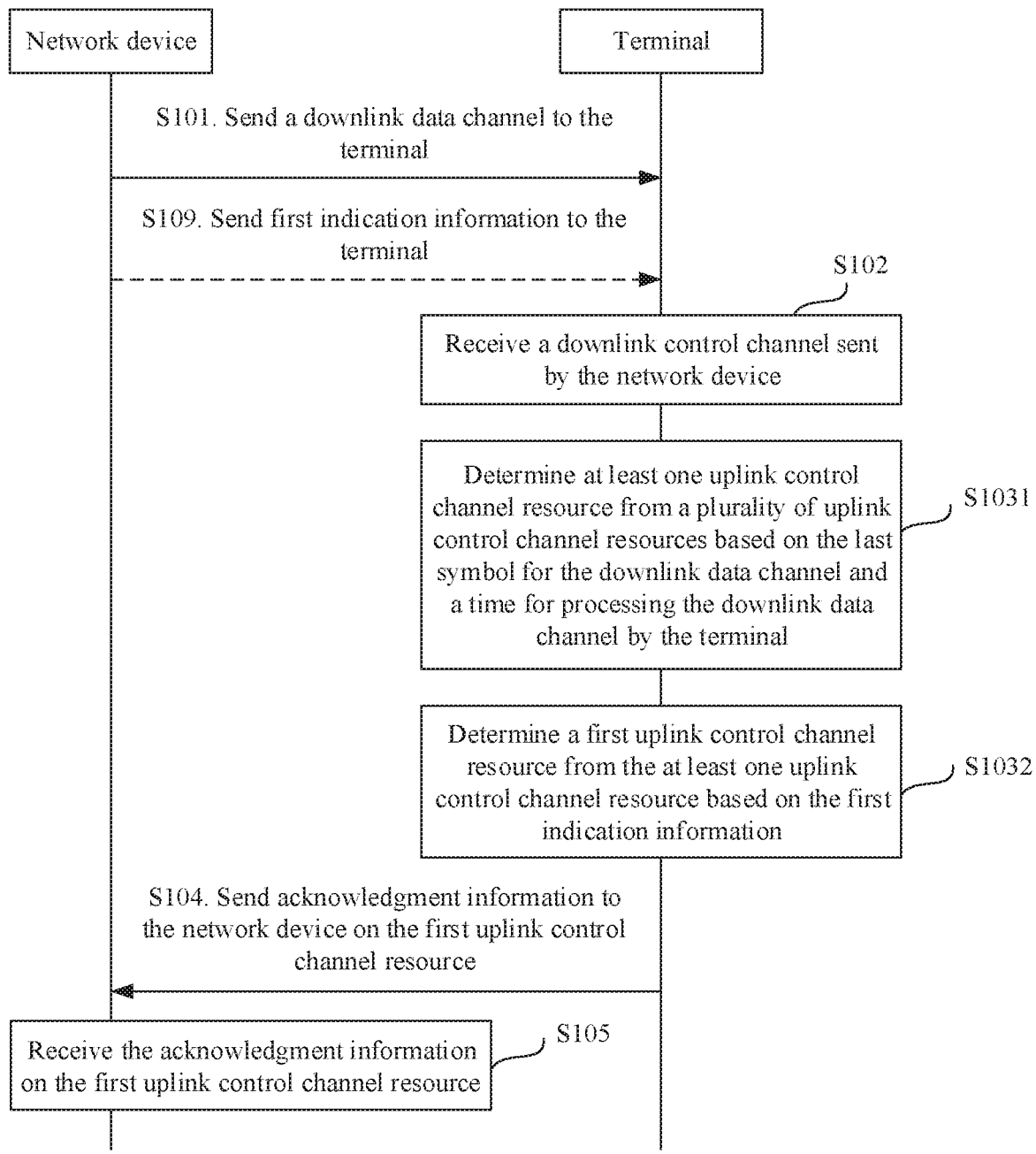
FIG. 23 is a schematic flowchart 5 of a resource indication method and a resource determining method according to this application.

In a possible implementation, when the network device groups uplink control channel resources with a same start symbol into a same resource group by using the foregoing possible implementation 1, the at least one uplink control channel resource belongs to one of the M resource groups. As shown in FIG. 23, the method provided in this application further includes the following step:

S109. The network device sends first indication information to the terminal, where the first indication information is used to indicate to determine the first uplink control channel resource from the at least one uplink control channel resource.

Specifically, the at least one uplink control channel resource may be specifically determined in step S1031 in the foregoing embodiment.

In a possible implementation, the first indication information may be a parameter of the first uplink control channel resource or an index of the first uplink control channel resource, for example, a start symbol, a time-domain length, a frequency-domain position, and a cyclic shift. It may be understood that each of the plurality of uplink control channel resources in this application has an index. In this case, the index may be configured by the network device, or may be configured by the terminal and fed back to the network device. Specific configuration of the index is not limited in this application.

Specifically, the first indication information may be carried in the DCI in step S103 and sent to the terminal, and the first indication information occupies a maximum of three bits in the DCI.

Based on step S109, step S1032 provided in this application may be implemented in the following manner: The terminal determines the first uplink control channel resource from the at least one uplink control channel resource based on the first indication information.

In another possible implementation, the first indication information is a start control channel element (CCE)-index of a control channel corresponding to the downlink data channel. In this case, the terminal may obtain first uplink control channel resource through mapping from the at least one uplink control channel resource by using the start control channel element (CCE)-index of the control channel corresponding to the downlink data channel. Certainly, the terminal may alternatively determine the first uplink control channel resource from the at least one uplink control channel resource in another manner. Details are not described herein in this application.

Figure 24:
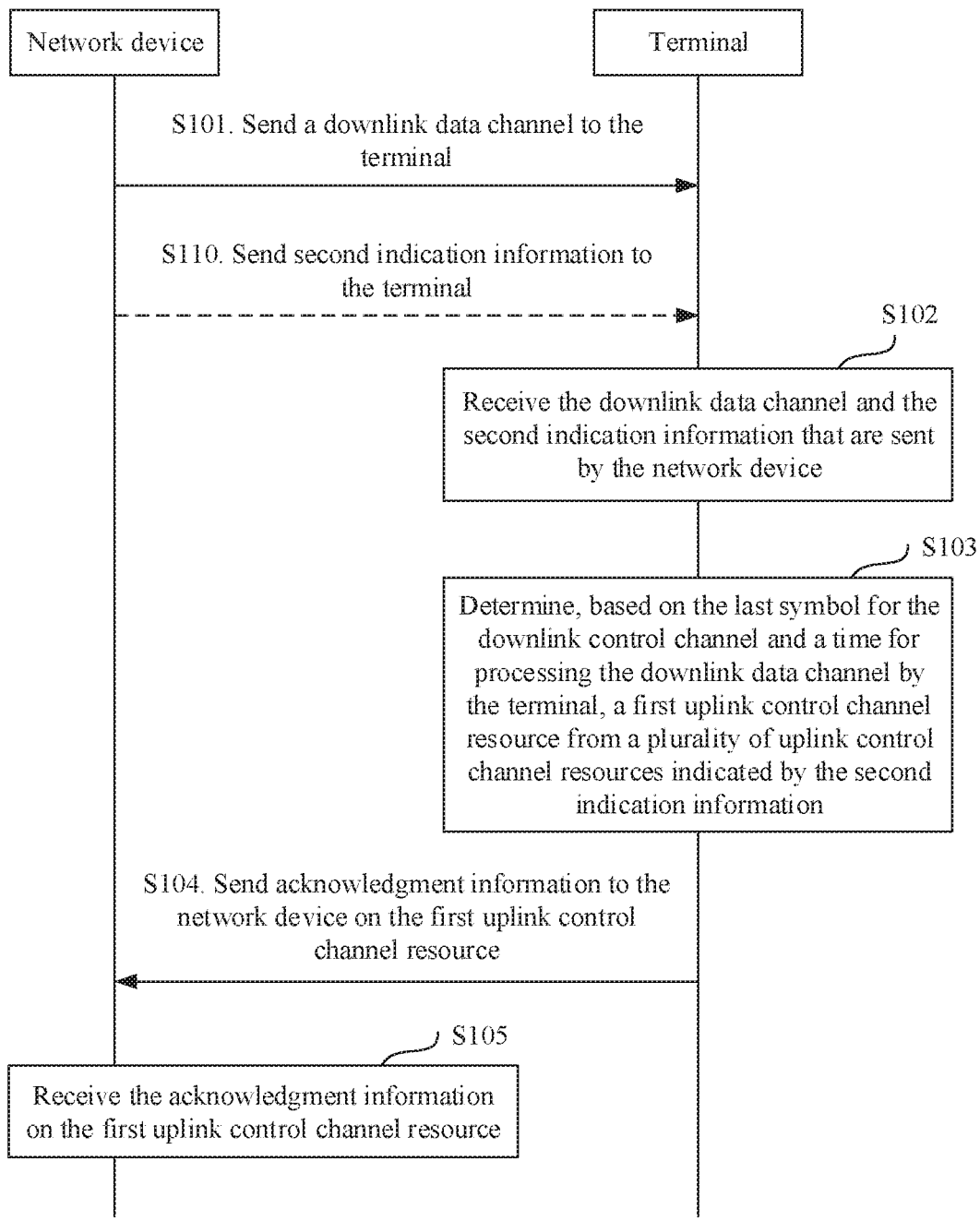
FIG. 24 is a schematic flowchart 6 of a resource indication method and a resource determining method according to this application.

When the network device groups uplink control channel resources with different start symbols into a same resource group by using the foregoing possible implementation 2, the plurality of uplink control channel resources belong to the same resource group, and the plurality of uplink control channel resources have different start symbols. As shown in FIG. 24, the method provided in this application further includes the following steps:

S110. The network device sends second indication information to the terminal, where the second indication information is used to indicate a resource group to which the plurality of uplink control channel resources belong.

In an example, the second indication information may be an identifier of the resource group to which the plurality of uplink control channel resources belong.

In another example, the second indication information may be a start control channel element (CCE)-index of a control channel corresponding to the downlink data channel. In this case, the terminal may determine, by using the start control channel element (CCE)-index of the control channel corresponding to the downlink data channel, the resource group to which the plurality of uplink control channel resources belong from resource groups to which all uplink control channel resources configured by the network device for the terminal belong.

S111. The terminal determines, based on the second indication information, the resource group to which the plurality of uplink control channel resources belong.

It may be understood that both the first indication information and the second indication information in this application are carried in DCI, and sent by the network device to the terminal.

It should be noted that, when the network device does not group the plurality of uplink control channel resources, the terminal may group the plurality of uplink control channel resources into the M resource groups based on the foregoing principle of grouping into the resource group by the network device; and after grouping the plurality of uplink control channel resources into the M resource groups, the terminal feeds back an identifier of each resource group and an identifier of at least one uplink channel control resource included in each resource group to the network device (certainly, this step may be performed before step S110). In this case, in a process of performing S101, the network device may carry, in the DCI, an identifier used to indicate a first resource group, so that after receiving the DCI, the terminal determines, based on the identifier of the first resource group, an uplink control channel resource included in the first resource group as the at least one uplink control channel resource.

In another embodiment A of this application, the at least one uplink control channel resource in S1031 is located in a first time unit, and an index of the first time unit is determined based on an index of a second time unit in which a second time-domain symbol is located and an offset indicated by a hybrid automatic repeat request feedback timing indicator field (PDSCH-to-HARQ_feedback timing indicator) of the downlink data channel.

An index of the second time-domain symbol is determined based on a first time and an index of the last time-domain symbol occupied by the downlink data channel.

The first time is related to at least one parameter of a downlink data channel processing capability, a subcarrier spacing, a demodulation reference signal configuration, and a quantity of time-domain symbols occupied by the downlink data channel.

For example, the first time may be a time (in symbol) for processing the downlink data channel by the terminal.

For example, the terminal uses, as the second time-domain symbol, the $1^{st}$ time-domain symbol plus an index of the last time-domain symbol occupied by the downlink data channel plus following the first time. Then the terminal uses the second time unit in which the second time-domain symbol is located as a start time unit S, and then uses a preconfigured uplink control channel resource in a time unit (S+K1) as the at least one uplink control channel resource. The terminal determines the first uplink control channel resource from the at least one uplink control channel resource by using a physical uplink control channel resource indicator field (PUCCH resource indicator, PRI).

K1 represents an offset indicated by the PDSCH-to-HARQ_feedback timing indicator.

For example, if a quantity of a plurality of (for example, K, where K is a positive integer) uplink control channel resources preconfigured for the terminal is less than or equal to 8, the terminal may directly determine at least one uplink control channel resource (for example, L, where L is a positive integer less than or equal to K) by using the PUCCH resource indicator. If the quantity of the plurality of uplink control channel resources preconfigured for the terminal is greater than 8 and less than or equal to 16, the first uplink control channel resource is determined from the at least one uplink control channel resource by using the PUCCH resource indicator and a start resource index (for example, a CCE-index and a PRB index) of the PDCCH.

The time unit may be one slot (X=14 when there is a normal CP cyclic prefix, and X=12 when there is an extended CP), one half-slot (X=7 when there is a normal CP, and X=6 when there is an extended CP), and X OFDM symbols (X is configured by using a higher-layer parameter).

Optionally, in the TDD system, a symbol in a slot is configured as a downlink symbol, a flexible symbol, or an uplink symbol by using higher layer signaling, and a HARQ-ACK may be sent on the flexible symbol or the uplink symbol. If all time-domain symbols included in a specific time unit are downlink symbols, the time unit usually cannot send acknowledgment information.

The flexible symbol is a symbol that can be used for both uplink transmission and downlink transmission. An uplink symbol is used for uplink transmission. A downlink symbol is used for downlink transmission.

In NR R15, a time unit of the PDSCH-to-HARQ_feedback timing indicator is a slot. In R16 URLLC, a time unit corresponding to the PDSCH-to-HARQ_feedback timing indicator may be half a slot or X OFDM symbols. In this case, all time-domain symbols corresponding to some time units are downlink symbols.

If the PDSCH-to-HARQ_feedback timing indicator includes such a time unit, a value range indicated by the PDSCH-to-HARQ_feedback timing indicator becomes larger. Consequently, a quantity of bits indicated by the PDSCH-to-HARQ_feedback timing indicator field is excessively large, affecting PDCCH receiving performance.

Therefore, in the TDD system, when P time units are included between the first time unit and the second time unit in which the second time-domain symbol is located, and all time-domain symbols in the P time units are downlink symbols, the index of the first time unit is determined based on an index of the second time unit in which the second time-domain symbol is located, an offset, and P, where P is an integer greater than or equal to 1. The P time units may be consecutive in time, or may be inconsecutive in time.

The index of the second time-domain symbol is related to the index of the last time-domain symbol occupied by the downlink data channel.

For example, the index of the second time-domain symbol may be a sum of a first offset and the index of the last time-domain symbol occupied by the downlink data channel. For example, the first offset may be indicated by the network device, or may be preconfigured, or may be determined by the terminal.

Specifically, the index of the first time unit is determined based on the offset plus the P time units plus the index of the second time unit in which the second time-domain symbol is located.

It should be understood that the index of the first time unit is used to determine a position of the first time unit. The index of the second time-domain symbol is used to determine a position of the second time-domain symbol.

Optionally, in another implementation in the TDD mode, counting starts from the second time unit in ascending order of time unit indexes. To be specific, the second time unit is counted 0, a time unit following the second time unit is counted 1, a downlink time unit is not counted, and counting is performed until a time unit corresponding to a time unit offset is reached. The time unit serves as the first time unit. The downlink time unit means that all symbols in the time unit are downlink symbols.

Specifically, FIG. 24 shows an example in which the first time unit is a half (half)-slot. The second time-domain symbol is located in a time unit n, and a value indicated by the hybrid automatic repeat request feedback timing indicator field is 2. If a limitation to uplink and downlink symbols is not considered, the first time unit is a time unit (n+2) in FIG. 24. If a limitation to uplink and downlink symbols is considered, assuming that all seven symbols of a time unit (n+1) are downlink symbols, the first time unit is a time resource (n+3). If all seven symbols of each of the time resource (n+1) and the time resource (n+3) are downlink symbols, the first time unit is a time unit (n+4). By analogy, if P time units are included between the first time unit and the second time unit in which the second time-domain symbol is located, and the P time units are corresponding to downlink symbols, the time units with only the downlink symbols are not included when the index of the first time unit is determined. However, the index of the first time unit needs to be determined based on the P time units plus a sum of the offset and an index of the second time unit in which the second time-domain symbol is located.

In another embodiment B of this application, the at least one uplink control channel resource in S1031 is located in the first time unit, the index of the first time unit is determined based on an index of a third time unit in which a third time-domain symbol is located and an offset indicated by a hybrid automatic repeat request feedback timing indicator field (PDSCH-to-HARQ_feedback timing indicator) of the downlink data channel. The third time-domain symbol is the last time-domain symbol occupied by the downlink data channel.

Specifically, the terminal uses the last time-domain symbol occupied by the downlink data channel as the third time-domain symbol. Then the terminal uses the third time unit in which the third time-domain symbol is located as a start time unit S, and then uses a preconfigured uplink control channel resource in a time unit (S+K1) as the at least one uplink control channel resource. The terminal determines the first uplink control channel resource from the at least one uplink control channel resource by using an uplink control channel resource indicator field (PUCCH resource indicator).

In a TDD system, when P time units are included between the first time unit and the third time unit in which the third time-domain symbol is located, and all symbols in the P time units are downlink symbols, the index of the first time unit is determined by an offset, P, and an index of the third time unit in which the third time-domain symbol is located, where P is an integer greater than or equal to 1. The P time units may be consecutive in time, or may be inconsecutive in time.

Specifically, the index of the first time unit is determined based on the offset plus the P time units plus the index of the third time unit in which the third time-domain symbol is located.

Figure 22:
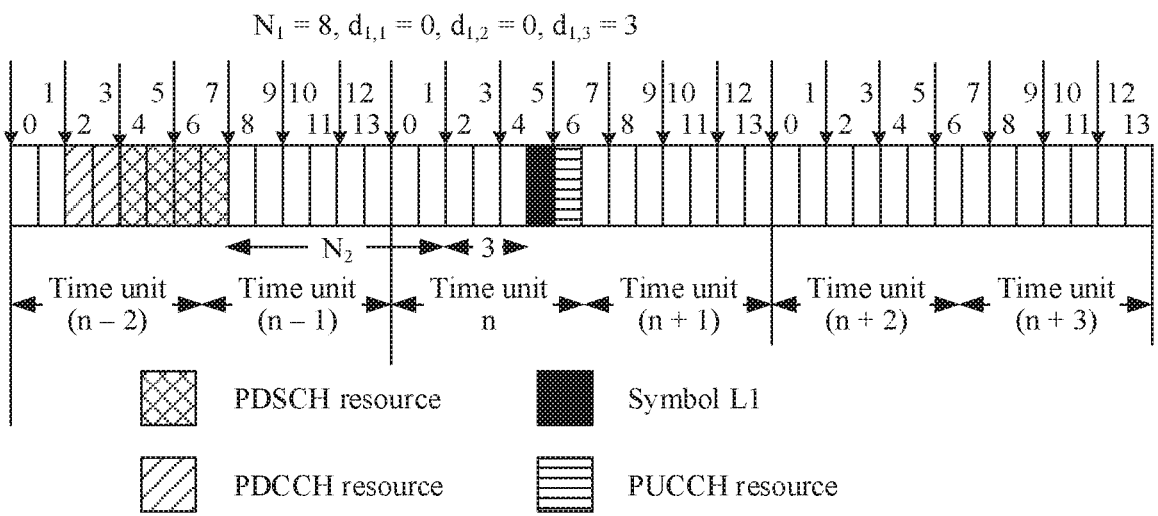
FIG. 22 is a schematic diagram 15 of an uplink control channel resource according to an embodiment of this application.

It should be understood that the index of the first time unit is used to determine a position of the first time unit. An index of the third time-domain symbol is used to determine a position of the third time-domain symbol. Specifically, FIG. 22 shows an example in which the first time unit is a half-slot. The third time-domain symbol is located in a time unit n, and a value indicated by the hybrid automatic repeat request feedback timing indicator field is 2. If a limitation to uplink and downlink symbols is not considered, the first time unit is a time unit (n+2) in FIG. 22. If a limitation to uplink and downlink symbols is considered, assuming that all seven symbols of a time unit (n+1) are downlink symbols, the first time unit is a time resource (n+3). If all seven symbols of each of the time resource (n+1) and the time resource (n+3) are downlink symbols, the first time unit is a time unit (n+4). By analogy, if P time units are included between the first time unit and the third time unit in which the third time-domain symbol is located, and the P time units are corresponding to downlink symbols, the time units with only the downlink symbols are not included when the index of the first time unit is determined. In other words, the index of the first time unit needs to be determined based on the P time units plus a sum of an offset and the index of the third time unit in which the third time-domain symbol is located.

Optionally, in another implementation in the TDD mode, counting starts from the third time unit in ascending order of time unit indexes. To be specific, the third time unit is counted 0, a time unit following the third time unit is counted 1, a downlink time unit is not counted, and counting is performed until a time unit corresponding to a time unit offset is reached. The time unit serves as the first time unit. The downlink time unit means that all symbols in the time unit are downlink symbols.

In this embodiment of this application, all processes in which the terminal determines the at least one uplink control channel resource and determines the parameter of the first uplink control channel resource may be performed by the network device. In this case, after determining the at least one uplink control channel resource and the first uplink control channel resource, the network device may send the at least one uplink control channel resource and the determined parameter of the first uplink control channel resource to the terminal.

When any one of the at least one uplink control channel resource and the first uplink control channel resource is determined by the terminal, the network device may receive acknowledgment information on the determined uplink control channel resource. Specifically, the network device may receive the information based on a specific position of the determined uplink control channel resource.

In another embodiment of this application, the method provided in this embodiment of this application further includes the following steps.

S201. The network device sends a downlink data channel.

For a specific process, refer to the description in S101. Details are not described herein again.

S202. The terminal receives the downlink data channel.

For a specific process, refer to the description in S102. Details are not described herein again.

S203. The terminal determines a first uplink control channel resource from K uplink control channel resources based on an index of the last time-domain symbol occupied by the downlink data channel, a first time, and an offset indicated by a hybrid automatic repeat request feedback timing indicator field for the downlink data channel, where K is a positive integer.

Specifically, the terminal determines the first uplink control channel resource from the K uplink control channel resources based on the index of the last time-domain symbol occupied by the downlink data channel plus the first time plus the offset indicated by the hybrid automatic repeat request feedback timing indicator field for the downlink data channel.

For example, the first time is related to at least one parameter of a downlink data channel processing capability, a subcarrier spacing, a demodulation reference signal configuration, and a quantity of time-domain symbols occupied by the downlink data channel. For example, the first time may be a capability of parsing the downlink data channel by the terminal.

For example, in a possible implementation, S203 may be implemented in the following manner: The terminal determines L uplink control channel resources from the K uplink control channel resources based on the index of the last time-domain symbol occupied by the downlink data channel, the first time, and the offset indicated by the hybrid automatic repeat request feedback timing indicator field for the downlink data channel, where L is a positive integer, and L is less than or equal to K; and determines the first uplink control channel resource from the L uplink control channel resources.

For example, the L uplink control channel resources are located in a first time unit, and an index of the first time unit is determined based on an index of a second time unit in which a second time-domain symbol is located and an offset indicated by a hybrid automatic repeat request feedback timing indicator field for the downlink data channel. An index of the second time-domain symbol is determined based on the first time and the index of the last time-domain symbol occupied by the downlink data channel.

S204. The terminal sends acknowledgment information to the network device on the first uplink control channel resource, where the acknowledgment information is used to indicate whether the downlink data channel is correctly received.

For details, refer to S104. Details are not described herein again.

S205. The network device receives the acknowledgment information on the first uplink control channel resource.

For details, refer to the description in S105. Details are not described herein again.

In another possible embodiment of this application, when P time units are included between the second time unit and the first time unit, and all symbols in the P time units are downlink symbols, the index of the first time unit is determined based on the index of the second time unit, the offset, and P, where P is a positive integer.

Optionally, the first uplink control channel resource is an uplink control channel resource in the L uplink control channel resources that is determined based on an uplink control channel resource indicator field.

For a specific implementation process of S201 to S205, refer to the related description and examples in Embodiment A. Details are not described herein again.

The foregoing mainly describes the solutions provided in the embodiments of this application from a perspective of interaction between network elements. It may be understood that to implement the foregoing functions, the network elements, such as the terminal and the network device, include a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into functional modules may be performed on the terminal and the network device based on the foregoing method examples. For example, division into the functional modules may be performed based on corresponding functions, or two or more functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used. The following provides description by using an example in which division into the functional modules is performed based on corresponding functions.

Figure 25:
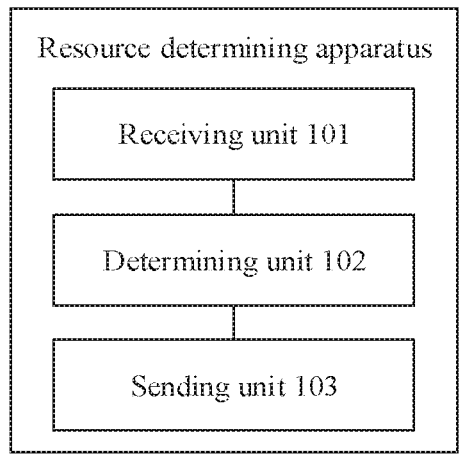
FIG. 25 is a schematic structural diagram 1 of a resource determining apparatus according to this application.

When an integrated unit is used, FIG. 25 is a possible schematic structural diagram of the resource determining apparatus in the foregoing embodiments. The resource determining apparatus may be a terminal, or a chip applied to a terminal. The resource determining apparatus includes a receiving unit 101, a determining unit 102, and a sending unit 103.

The receiving unit 101 is configured to support the resource determining apparatus in performing steps S102 and S107 in the foregoing embodiment. The determining unit 102 is configured to support the resource determining apparatus in performing steps S103, S1031, S1032, and S108 in the foregoing embodiment. The sending unit 103 is configured to support the resource determining apparatus in performing step S104 in the foregoing embodiment. All related content of the steps in the foregoing method embodiments may be cited in function descriptions of the corresponding functional modules. Details are not described herein.

Based on hardware implementation, in this application, the sending unit 103 may be a terminal or a transmitter of a chip applied to a terminal, the receiving unit 101 may be a terminal or a receiver of a chip applied to a terminal, and the transmitter and the receiver may be usually integrated together to serve as a transceiver. Specifically, the transceiver may also be referred to as a communications interface or a transceiver circuit, and the determining unit 102 may be integrated into a terminal or a processor of a chip applied to a terminal.

Figure 26:
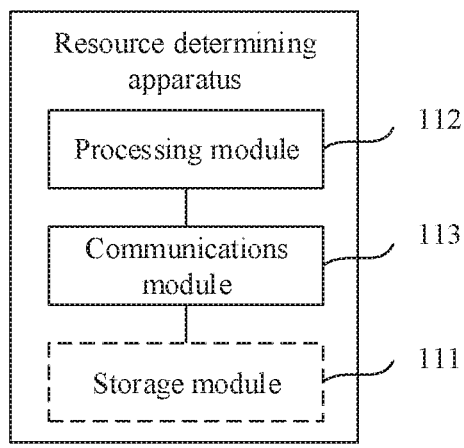
FIG. 26 is a schematic structural diagram 2 of a resource determining apparatus according to this application.

When an integrated unit is used, FIG. 26 is a possible schematic logical structural diagram of a resource determining apparatus in the foregoing embodiment. The resource determining apparatus may be a terminal or a chip applied to a terminal, and the resource determining apparatus includes a processing module 112 and a communications module 113. The processing module 112 is configured to control and manage an action of the resource determining apparatus. For example, the processing module 112 is configured to perform a step of processing a message or data on a side of the resource determining apparatus. For example, the processing module 112 supports the resource determining apparatus in performing steps S103, S1031, S1032, and S108 in the foregoing embodiment. The communications module 113 is configured to support the resource determining apparatus in performing S102, SI 07, and S104 in the foregoing embodiment; and/or performing another process performed by the resource determining apparatus in the technology described in this specification. Optionally, the resource determining apparatus may further include a storage module 111, configured to store program code and data of the resource determining apparatus.

The processing module 112 may be a processor or controller. For example, the processing module 112 may be a central processing unit, a general-purpose processor, a digital signal processor (DSP), an application-specific integrated circuit (ASIC), a field programmable gate array (FPGA) or another programmable logical device, a transistor logical device, a hardware component, or any combination thereof. The processing module 112 may implement or execute various example logical blocks, modules, and circuits described with reference to content disclosed in the present invention. Alternatively, the processor module 112 may be a combination of processors implementing a computing function, for example, a combination of one or more microprocessors, or a combination of a digital signal processor and a microprocessor. The communications module 113 may be a transceiver, a transceiver circuit, a communications interface, or the like. The storage module 111 may be a memory.

Figure 27:
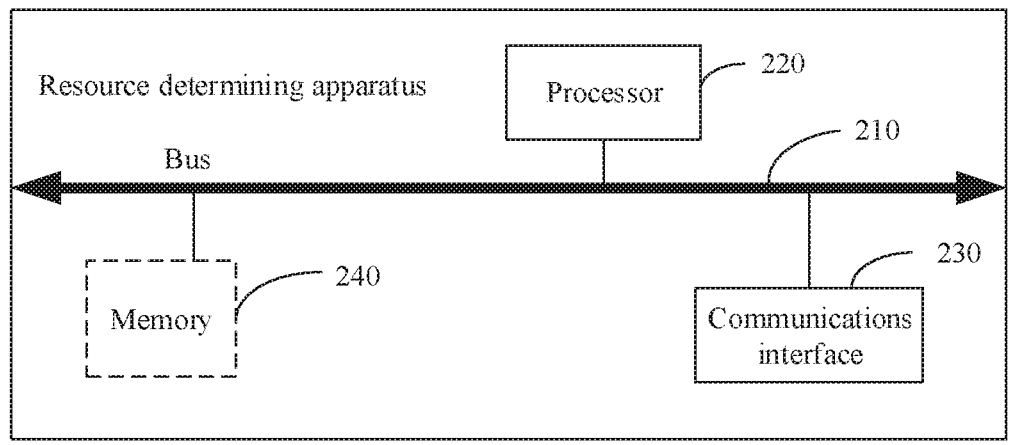
FIG. 27 is a schematic structural diagram 3 of a resource determining apparatus according to this application.

When the processing module 112 is a processor 220, the communications module 113 is a communications interface 230 or a transceiver, and the storage module 111 is a memory 240, the resource determining apparatus in this application may be a device shown in FIG. 27.

The communications interface 230, at least one processor 220, and the memory 240 are connected to each other by using a bus 210. The bus 210 may be a PCI (Peripheral Component Interconnect) bus, an EISA (Extended Industry Standard Architecture) bus, or the like. The bus may be classified into an address bus, a data bus, a control bus, and the like. For ease of representation, only one thick line is used to represent the bus in FIG. 27, but this does not mean that there is only one bus or only one type of bus. The memory 240 is configured to store program code and data of the resource determining apparatus. The communications interface 230 is configured to support the resource determining apparatus in communicating with another device (for example, a resource indication apparatus), and the processor 220 is configured to support the resource determining apparatus in executing the program code and the data that are stored in the memory 240, to implement the resource determining method provided in this application.

Figure 28:
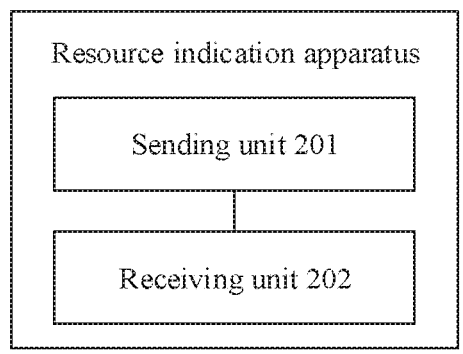
FIG. 28 is a schematic structural diagram 1 of a resource indication apparatus according to this application.

When an integrated unit is used. FIG. 28 is a possible schematic structural diagram of the resource indication apparatus in the foregoing embodiment. The resource indication apparatus may be a network device, or a chip applied to a network device. The resource indication apparatus includes a sending unit 201 and a receiving unit 202. The sending unit 201 is configured to support the resource indication apparatus in performing steps S101, S106, S109, and S110 in the foregoing embodiment. The receiving unit 202 is configured to support the resource indication apparatus in performing step S105 in the foregoing embodiment; and/or performing another process in the technology described in this specification. All related content of the steps in the foregoing method embodiments may be cited in function descriptions of the corresponding functional modules. Details are not described herein.

Based on hardware implementation, in this application, the receiving unit 202 may be a network device or a receiver of a chip applied to a network device, the sending unit 201 may be a network device or a transmitter of a chip applied to a network device, the receiver and the network device or the transmitter of the chip applied to the network device may be usually integrated together to serve as a transceiver. Specifically, the transceiver may also be referred to as a communications interface or a transceiver circuit.

Figure 29:
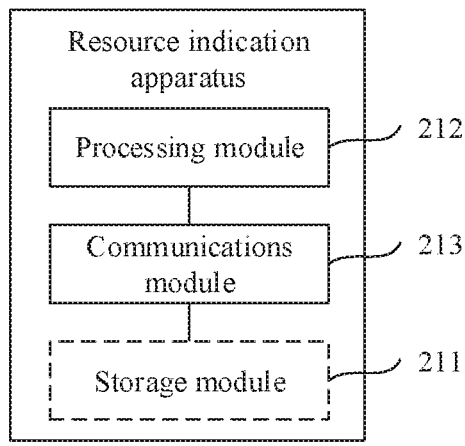
FIG. 29 is a schematic structural diagram 2 of a resource indication apparatus according to this application.

When an integrated unit is used, FIG. 29 is a possible schematic structural diagram of the resource indication apparatus in the foregoing embodiment. The resource indication apparatus may be a network device, or a chip applied to a network device. The resource indication apparatus includes a processing module 212 and a communications module 213. The processing module 212 is configured to control and manage an action of the resource indication apparatus. For example, the processing module 212 is configured to support the resource indication apparatus in performing an operation of processing a message or data on a side of the resource indication apparatus in the foregoing embodiment. The communications module 213 is configured to support the resource indication apparatus in performing an operation of receiving and sending a message or data on the side of the resource indication apparatus in the foregoing embodiment, for example, steps S101, S105, S106, S109, and S110 in the foregoing embodiment; and/or performing another process performed by the resource indication apparatus in the technology described in this specification.

Optionally, the resource indication apparatus may further include a storage module 211, configured to store program code and data of the resource indication apparatus.

The processing module 212 may be a processor or controller. For example, the processing module 112 may be a central processing unit, a general-purpose processor, a digital signal processor (DSP), an application-specific integrated circuit (ASIC), a field programmable gate array (FPGA) or another programmable logical device, a transistor logical device, a hardware component, or any combination thereof. The processing module 112 may implement or execute various example logical blocks, modules, and circuits described with reference to content disclosed in the present invention. Alternatively, the processor may be a combination of processors implementing a computing function, for example, a combination of one or more microprocessors, or a combination of a digital signal processor and a microprocessor. The communications module 213 may be a transceiver, a transceiver circuit, a communications interface, or the like. The storage module 211 may be a memory.

Figure 30:
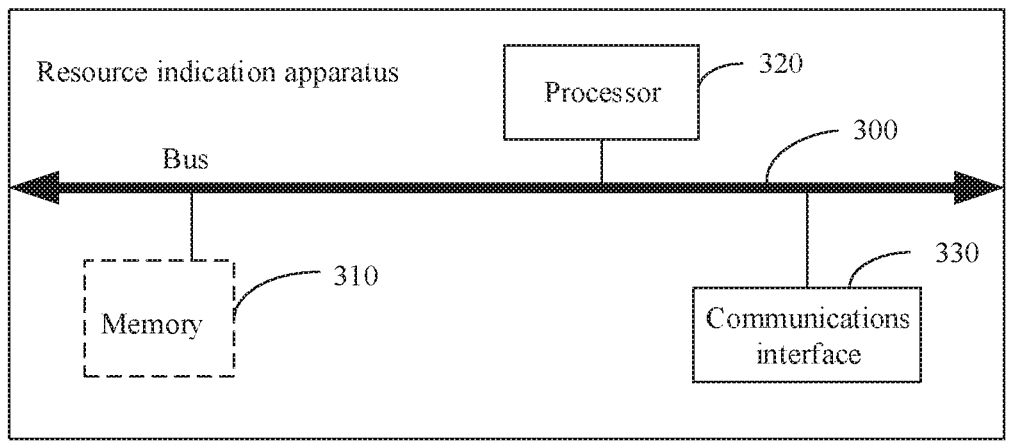
FIG. 30 is a schematic structural diagram 3 of a resource indication apparatus according to this application.

When the processing module 212 is a processor 320, the communications module 213 is a communications interface 330 or a transceiver, and the storage module 211 is a memory 310, the resource indication apparatus in this application may be a device shown in FIG. 30.

The communications interface 330, at least one processor 320, and the memory 310 are connected to each other by using a bus 3). The bus 300 may be a PCI bus, an EISA bus, or the like. The bus may be classified into an address bus, a data bus, a control bus, and the like. For ease of representation, only one thick line is used to represent the bus in FIG. 30, but this does not mean that there is only one bus or only one type of bus. The memory 310 is configured to store program code and data of the resource indication apparatus. The communications interface 330 is configured to support the resource indication apparatus in communicating with another device (for example, a resource determining apparatus), and the processor 320 is configured to support the resource indication apparatus in executing the program code and the data that are stored in the memory 310, to implement the resource indication method provided in this application.

The foregoing receiving unit (or a unit used for receiving) is an interface circuit of the apparatus and is configured to receive a signal from another apparatus. For example, when the apparatus is implemented in a manner of a chip, the receiving unit is an interface circuit, of the chip, that is configured to receive a signal from another chip or apparatus. The foregoing sending unit (or a unit used for sending) is an interface circuit of the apparatus and is configured to send a signal to another apparatus. For example, when the apparatus is implemented in a manner of a chip, the sending unit is an interface circuit, of the chip, that is configured to send a signal from another chip or apparatus.

Figure 31:
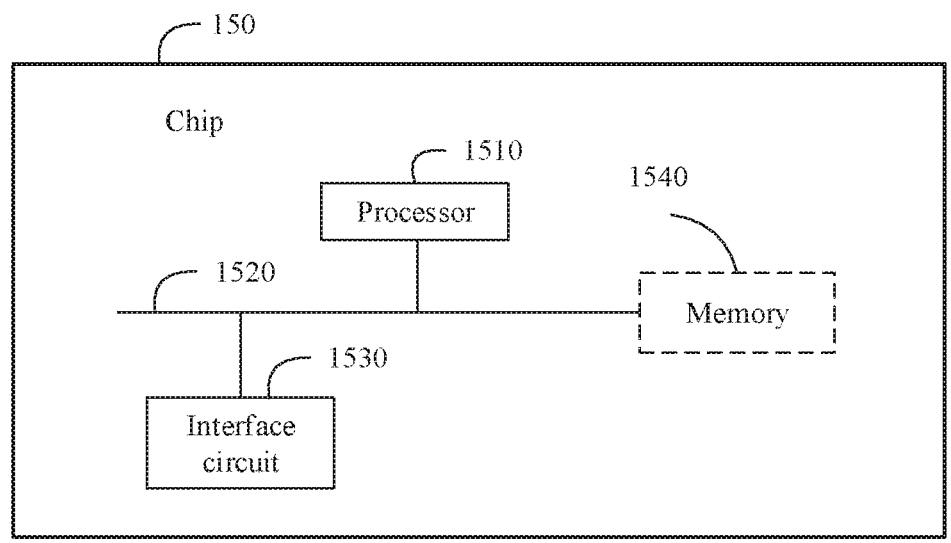
FIG. 31 is a schematic structural diagram of a chip according to this application.

FIG. 31 is a schematic structural diagram of a chip 150 according to an embodiment of the present invention. The chip 150 includes at least one processor 1510 and an interface circuit 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (non-volatile random access memory, NVRAM).

In some implementation manners, the memory 1540 stores the following elements, an executable module or a data structure, or a subset thereof, or an extended set thereof.

In this embodiment of the present invention, a corresponding operation is performed by invoking the operation instruction stored in the memory 1540 (the operation instruction may be stored in an operating system).

In a possible implementation, structures of chips used by the terminal and the network device are similar, and different apparatuses may use different chips to implement respective functions.

The processor 1510 controls operations of the terminal and the network device, and the processor 1510 may also be referred to as a CPU. The memory 1540 may include a read-only memory and a random access memory, and provide an instruction and data for the processor 1510. A part of the memory 1540 may further include a non-volatile random access memory (NVRAM). In specific application, the memory 1540, the interface circuit 1530, and the memory 1540 are coupled together by using a bus system 1520. In addition to a data bus, the bus system 1520 may further include a power bus, a control bus, a status signal bus, and the like. However, for clear description, various types of buses in FIG. 31 are marked as the bus system 1520.

The data signal generation method or the data signal processing method disclosed in the foregoing embodiments of the present invention may be applied to the processor 1510, or may be implemented by the processor 1510. The processor 1510 may be an integrated circuit chip and has a signal processing capability. In an implementation process, steps of the data signal generation method or the data signal processing method may be completed by using a hardware integrated logic circuit in the processor 1510 or an instruction in a form of software. The processor 1510 may be a general-purpose processor, a digital signal processor (DSP), an application-specific integrated circuit (ASIC), a field-programmable gate array (FPGA) or another programmable logical device, a discrete gate or transistor logic device, or a discrete hardware component. It may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in a decoding processor. A software module may be located in a storage medium mature in the art, such as a random access memory, a flash memory, a read-only memory, a programmable read-only memory, an electrically erasable programmable memory, or a register. The storage medium is located in the memory 1540, and the processor 1510 reads information from the memory 1540 and completes the steps in the foregoing methods in combination with hardware of the processor 1510.

Optionally, the interface circuit 1530 is configured to perform receiving and sending steps of the terminal and the network device in the embodiments shown in FIG. 4, FIG. 5, FIG. 8, FIG. 16, FIG. 23, and FIG. 24.

The processor 1510 is configured to perform processing steps of the terminal and the network device in the embodiments shown in FIG. 4, FIG. 5, FIG. 8, FIG. 16, FIG. 23, and FIG. 24.

In the foregoing embodiments, the instruction that is stored in the memory and that is to be executed by the processor may be implemented in a form of a computer program product. The computer program product may be written to the memory in advance, or may be downloaded and installed in the memory in a form of software.

The computer program product includes one or more computer instructions. When the computer program instructions are loaded and executed on the computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk, SSD), or the like.

According to an aspect, a computer storage medium is provided. The computer-readable storage medium stores an instruction. When the instruction is run, a terminal or a chip applied to a terminal is enabled to perform S102, S107, S103, S1031, S1032, S108, and S104 in the embodiments; and/or perform another process performed by the terminal or the chip applied to the terminal in the technology described in this specification. The foregoing readable storage medium may include: any medium that can store program code, such as a USB flash drive, a removable hard disk, a read-only memory, a random access memory, a magnetic disk, or an optical disc.

According to another aspect, a computer storage medium is provided. The computer-readable storage medium stores an instruction. When the instruction is run, a network device or a chip applied to a network device is enabled to perform S101, S106, S109, S110, and S105 in the embodiments; and/or perform another process performed by the network device or the chip applied to the network device in the technology described in this specification.

According to an aspect, a computer program product including an instruction is provided. The computer program product stores the instruction. When the instruction is run, a terminal or a chip applied to a terminal is enabled to perform S102, S107, S103, S1031, S1032, S108, and S104 in the embodiments; and/or perform another process performed by the terminal or the chip applied to the terminal in the technology described in this specification.

According to another aspect, a computer program product including an instruction is provided. The computer program product stores the instruction. When the instruction is run, a network device or a chip applied to a network device is enabled to perform steps S101, S106, S109, S110, and S105 in the embodiments; and/or perform another process performed by the network device or the chip applied to the network device in the technology described in this specification.

According to an aspect, a chip is provided. The chip is applied to a terminal, the chip includes at least one processor and an interface circuit, the interface circuit is interconnected with the at least one processor by using a line, and the processor is configured to run an instruction, to perform S102, S107, S103, S1031, S1032, S108, and S104 in the embodiments; and/or perform another process performed by the terminal in the technology described in this specification.

According to another aspect, a chip is provided. The chip is applied to a network device, the chip includes at least one processor and an interface circuit, the interface circuit is interconnected with the at least one processor by using a line, and the processor is configured to run an instruction, to perform steps S101, S106, S109, S110, and S105 in the embodiments; and/or perform another process performed by the network device in the technology described in this specification.

According to still another aspect, this application provides a communications system. The communications system includes the resource indication apparatus shown in either FIG. 28 or FIG. 29 and the resource determining apparatus shown in either FIG. 25 or FIG. 26.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource determining method, comprising:
   receiving a downlink data channel;
   determining a first uplink control channel resource from K uplink control channel resources based on an index of a last time-domain symbol occupied by the downlink data channel, a first time, and an offset indicated by a hybrid automatic repeat request feedback timing indicator field for the downlink data channel, wherein K is a positive integer, wherein the first time is related to at least one parameter of a downlink data channel processing capability, a subcarrier spacing, a demodulation reference signal configuration, or a quantity of time-domain symbols occupied by the downlink data channel; and
   sending acknowledgment information to a network device on the first uplink control channel resource, wherein the acknowledgment information is used to indicate whether the downlink data channel is correctly received.

2. The method according to claim 1, wherein the determining a first uplink control channel resource from K uplink control channel resources based on an index of the last time-domain symbol occupied by the downlink data channel, a first time, and an offset indicated by a hybrid automatic repeat request feedback timing indicator field for the downlink data channel comprises:
   determining L uplink control channel resources from the K uplink control channel resources based on the index of the last time-domain symbol occupied by the downlink data channel, the first time, and the offset indicated by the hybrid automatic repeat request feedback timing indicator field for the downlink data channel, wherein L is a positive integer, and wherein L is less than or equal to K; and determining the first uplink control channel resource from the L uplink control channel resources.

3. The method according to claim 2, wherein the L uplink control channel resources are located in a first time unit, and wherein an index of the first time unit is determined based on an index of a second time unit in which a second time-domain symbol is located and the offset indicated by the hybrid automatic repeat request feedback timing indicator field for the downlink data channel; and wherein an index of the second time-domain symbol is determined based on the first time and the index of the last time-domain symbol occupied by the downlink data channel.

4. The method according to claim 3, wherein when P time units are comprised between the second time unit and the first time unit, and when all symbols in the P time units are downlink symbols, the index of the first time unit is determined based on the index of the second time unit, the offset, and P, and wherein P is a positive integer.

5. The method according to claim 2, wherein the first uplink control channel resource is an uplink control channel resource in the L uplink control channel resources that is determined based on an uplink control channel resource indicator field.

6. An apparatus comprising:
a memory storing instructions; and
one or more processors coupled to the memory, wherein the instructions, when executed by the one or more processors, instruct the one or more processors to:
receive a downlink data channel;
determine a first uplink control channel resource from K uplink control channel resources based on an index of a last time-domain symbol occupied by the downlink data channel, a first time, and an offset indicated by a hybrid automatic repeat request feedback timing indicator field for the downlink data channel, wherein K is a positive integer, wherein the first time is related to at least one parameter of a downlink data channel processing capability, a subcarrier spacing, a demodulation reference signal configuration, or a quantity of time-domain symbols occupied by the downlink data channel; and
send acknowledgment information to a network device on the first uplink control channel resource, wherein the acknowledgment information is used to indicate whether the downlink data channel is correctly received.

7. The apparatus according to claim 6, wherein the determining a first uplink control channel resource from K uplink control channel resources based on an index of the last time-domain symbol occupied by the downlink data channel, a first time, and an offset indicated by a hybrid automatic repeat request feedback timing indicator field for the downlink data channel comprises:
determining L uplink control channel resources from the K uplink control channel resources based on the index of the last time-domain symbol occupied by the downlink data channel, the first time, and the offset indicated by the hybrid automatic repeat request feedback timing indicator field for the downlink data channel, wherein L is a positive integer, and wherein L is less than or equal to K; and
determining the first uplink control channel resource from the L uplink control channel resources.

8. The apparatus according to claim 7, wherein the L uplink control channel resources are located in a first time unit, and wherein an index of the first time unit is determined based on an index of a second time unit in which a second time-domain symbol is located and the offset indicated by the hybrid automatic repeat request feedback timing indicator field for the downlink data channel; and wherein an index of the second time-domain symbol is determined based on the first time and the index of the last time-domain symbol occupied by the downlink data channel.

9. The apparatus according to claim 8, wherein when P time units are comprised between the second time unit and the first time unit, and when all symbols in the P time units are downlink symbols, the index of the first time unit is determined based on the index of the second time unit, the offset, and P, and wherein P is a positive integer.

10. The apparatus according to claim 7, wherein the first uplink control channel resource is an uplink control channel resource in the L uplink control channel resources that is determined based on an uplink control channel resource indicator field.

11. An apparatus comprising:
a memory storing instructions; and
one or more processors coupled to the memory, wherein the instructions, when executed by the one or more processors, instruct the one or more processors to:
send a downlink data channel; and
receive acknowledgment information on a first uplink control channel resource, wherein the acknowledgment information is used to indicate whether the downlink data channel is correctly received, wherein the first uplink control channel resource is determined from K uplink control channel resources based on an index of a last time-domain symbol occupied by the downlink data channel, a first time, and an offset indicated by a hybrid automatic repeat request feedback timing indicator field for the downlink data channel, and wherein K is a positive integer, wherein the first time is related to at least one parameter of a downlink data channel processing capability, a subcarrier spacing, a demodulation reference signal configuration, or a quantity of time-domain symbols occupied by the downlink data channel.

12. The apparatus according to claim 11, wherein the first uplink control channel resource is an uplink control channel resource in L uplink control channel resources, wherein the L uplink control channel resources are determined from the K uplink control channel resources based on the index of the last time-domain symbol occupied by the downlink data channel, the first time, and the offset indicated by the hybrid automatic repeat request feedback timing indicator field for the downlink data channel, wherein L is a positive integer, and wherein L is less than or equal to K.

13. The apparatus according to claim 12, wherein the L uplink control channel resources are located in a first time unit, and wherein an index of the first time unit is determined based on an index of a second time unit in which a second time-domain symbol is located and the offset indicated by the hybrid automatic repeat request feedback timing indicator field for the downlink data channel; and wherein an index of the second time-domain symbol is determined based on the first time and the index of the last time-domain symbol occupied by the downlink data channel.

14. The apparatus according to claim 13, wherein when P time units are comprised between the second time unit and the first time unit, and when all symbols in the P time units are downlink symbols, the index of the first time unit is determined based on the index of the second time unit, the offset, and P, and wherein P is a positive integer.

15. The apparatus according to claim 12, wherein the first uplink control channel resource is an uplink control channel resource in the L uplink control channel resources that is determined based on an uplink control channel resource indicator field.

* * * * *

UNITED STATES PATENT AND TRADEMARK OFFICE
CERTIFICATE OF CORRECTION

PATENT NO. : 11,632,219 B2
APPLICATION NO. : 17/038960
DATED : April 18, 2023
INVENTOR(S) : Shurong Jiao and Peng Zhang It is certified that error appears in the above-identified patent and that said Letters Patent is hereby corrected as shown below:

On the Title Page

Item (30) Foreign Application Priority Data, Line 1, delete "(WO)" and insert -- (CN) --.

Signed and Sealed this
Fourth Day of July, 2023

Katherine Kelly Vidal
*Director of the United States Patent and Trademark Office*